(12) United States Patent
Kim

(10) Patent No.: US 11,410,657 B2
(45) Date of Patent: Aug. 9, 2022

(54) ARTIFICIAL ROBOT AND METHOD FOR SPEECH RECOGNITION THE SAME

(71) Applicant: LG ELECTRONICS INC., Seoul (KR)

(72) Inventor: Yireun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 16/592,386

(22) Filed: Oct. 3, 2019

(65) Prior Publication Data

US 2020/0035244 A1    Jan. 30, 2020

(30) Foreign Application Priority Data

Aug. 30, 2019  (KR) .................. 10-2019-0107801

(51) Int. Cl.
| | |
|---|---|
| G10L 15/26 | (2006.01) |
| G10L 15/06 | (2013.01) |
| G10L 15/30 | (2013.01) |
| G06N 20/00 | (2019.01) |

(52) U.S. Cl.
CPC .............. *G10L 15/26* (2013.01); *G06N 20/00* (2019.01); *G10L 15/063* (2013.01); *G10L 15/30* (2013.01)

(58) Field of Classification Search
CPC ....... G10L 15/063; G10L 15/30; G10L 15/02; G10L 15/04; G10L 15/183; G10L 15/22; G10L 15/26; G10L 15/265; G06N 20/00; G06N 3/008; G06N 3/0445; G06N 3/0454; G06N 3/0472; G06N 3/08; G06N 5/04; B25J 13/003; B25J 9/1679; G06F 40/30; G06F 40/56; G06F 40/58; H04W 24/10; H04W 72/14; H04W 74/002; H04W 74/0833

See application file for complete search history.

(56) References Cited

U.S. PATENT DOCUMENTS

| | | | | |
|---|---|---|---|---|
| 10,893,431 | B2 * | 1/2021 | Liou | H04W 24/10 |
| 2020/0364511 | A1 * | 11/2020 | Brown | G06F 40/30 |
| 2020/0380406 | A1 * | 12/2020 | Dickens | G06N 20/00 |
| 2021/0027020 | A1 * | 1/2021 | Shen | G06N 3/082 |

FOREIGN PATENT DOCUMENTS

| | | |
|---|---|---|
| JP | 2018-155980 A | 10/2018 |
| KR | 10-2019-0075017 A | 6/2019 |
| WO | WO 2018/151699 A1 | 9/2016 |

* cited by examiner

*Primary Examiner* — Angela A Armstrong
(74) *Attorney, Agent, or Firm* — Birch, Stewart, Kolasch & Birch, LLP

(57) ABSTRACT

Disclosed is a speech recognition method of an artificial intelligence robot. The speech recognition method includes: receiving uttered speech information of a user from an external device; inputting the speech information to a pre-learned first intent analysis model, and determining an utterance intent of the user according to an output value of the first intent analysis; transmitting response information corresponding to the determined utterance intent of the user to the external device; receive evaluation information of the user on the response information from the external device; and generating a second intent analysis model by adding the evaluation information to learning data and learning the first intent analysis model. Accordingly, an intelligent device is capable of learning an accurate utterance intent even without error correction by a manager.

18 Claims, 27 Drawing Sheets

FIG. 22

| User's Inquiry | Result of Intent Analysis ||
|---|---|---|
| | Intent | Score |
| 1. Where is a place to get Tax Refund? | Shop Location | 0.6 |
| | Tax Refund Counter Location | 0.3 |
| | Airplane Departure Time | 0.1 |
| 2. When is KAL203 departing? | Airplane Departure Time | 0.7 |
| | Duty Free Shop Location | 0.2 |
| | UNKNOWN | 0.1 |

FIG. 24

| ID | User's Inquiry | Result of Intent Analysis | Evaluation Information of User | | |
|---|---|---|---|---|---|
| | | Intent | Positive | Neutral | Negative |
| 1 | Where is Silla Duty Free Shop? | LOCATION_DUTY_FREE_SHOP | 200 | 100 | 3 |
| | | AIRPLANE_DEPARTURE_TIME | 0 | 10 | 200 |
| | | LOCATION_BUYING_GOODS | 20 | 20 | 40 |
| ... | | | | | |
| 4 | Where is a place to get Tax Refund? | LOCATION_BUYING_GOODS | 5 | 80 | 200 |
| | | LOCATION_TAX_REFUND | 150 | 30 | 1 |
| | | AIRPLANE_DEPARTURE_TIME | 3 | 60 | 110 |

ARTIFICIAL ROBOT AND METHOD FOR SPEECH RECOGNITION THE SAME

CROSS-REFERENCE TO RELATED APPLICATIONS

This application claims the benefit of Korea Patent Application No. 10-2019-0107801 filed on Aug. 30, 2019, which is incorporated herein by reference for all purposes as if fully set forth herein.

BACKGROUND OF THE INVENTION

Field of the Invention

The present disclosure relates to an artificial robot and a speech recognition method of the same, and more particularly to an artificial intelligence robot and a speech recognition method thereof, the artificial intelligence robot which is capable of learn an accurate utterance intent even though there is no error correction by a manager.

Related Art

An artificial intelligence system implementing human-level intelligence has been used in various fields. The artificial intelligence system is a system in which a machine performs learning and decision and becomes smart by itself unlike an existing rule-based smart system. As the artificial intelligence system is used more, a recognition rate is improved and a user's taste may be more accurately understood, such that the existing rule-based smart system has been gradually replaced by a deep learning-based artificial intelligence system.

An artificial intelligence technology may include machine learning (for example, deep learning) and element technologies using the machine learning.

The machine learning may include an algorithm technology of classifying/learning features of input data by itself, and the element technology may include a technology of simulating functions such as recognition, decision, and the like, of a human brain using a machine learning algorithm such as deep learning, or the like, and may include technical fields such as linguistic understanding, visual understanding, inference/prediction, knowledge representation, a motion control, and the like.

Various fields to which the artificial intelligence technology may be applied are as follows. The linguistic understanding may refer to a technology of recognizing and applying/processing human languages, and may include natural language processing, machine translation, a dialog system, question and answer, speech recognition/synthesis, or the like. The visual understanding may refer to a technology of recognizing and processing things like human vision, and may include object recognition, object tracking, image search, human recognition, scene understanding, space understanding, image improvement, or the like. The inference/prediction may refer to a technology of deciding and logically inferring and predicting information, and may include knowledge/probability-based inference, optimization prediction, preference-based planning, recommendation, or the like. The knowledge representation may refer to a technology of automating and processing human experience information as knowledge data, and may include knowledge construction (data creation/classification), knowledge management (data utilization), or the like. The motion control may refer to a technology of controlling self-driving of a vehicle and a motion of a robot, and may include a motion control (navigation, collision, driving), a manipulation control (behavior control), or the like.

In an interactive system which is one of cases where the artificial intelligence technology is utilized, an apparatus capable of recognizing speeches collects uttered speeches of a user and transmits the collected uttered speeches to an external server connected through a network. When the external server receives the uttered speeches, the external server analyzes the uttered speeches to identify intent of the user, generates response information corresponding to the uttered speeches, and transmits the response information to a display apparatus. Therefore, the display apparatus executes a function corresponding to the uttered speeches of the user or provides information corresponding to the uttered voices of the user based on the response information received from the external server.

However, the conventional interactive system has a limit to analyzing the uttered speeches of the user and identifying of the intent of the user based on the analytic result.

SUMMARY OF THE INVENTION

The present disclosure has been made in consideration of the aforementioned needs and/or the problems.

In addition, the present disclosure is to provide an artificial intelligence (AI)-based utterance intent determining method and an intelligent device, whereby an accurate intent can be learned by itself even without error correction by a manager.

In addition, the present disclosure is to provide an artificial intelligence (AI)-based utterance intent determining method and an intelligent device, whereby a deep learning model is learned according to a user's evaluation on determined utterance intent.

In addition, the present disclosure is to provide an artificial intelligence (AI)-based utterance intent determining method and an intelligent device, whereby at least one utterance intent is inquired with respect to similar speech information and a speed for learning a deep learning can be increased using a user's evaluation on each utterance intent.

In one general aspect of the present disclosure, there is provided a speech recognition method of an artificial intelligence robot, the method including: receiving uttered speech information of a user from an external device; inputting the speech information to a pre-learned first intent analysis model, and determining an utterance intent of the user according to an output value of the first intent analysis; transmitting response information corresponding to the determined utterance intent of the user to the external device; receive evaluation information of the user on the response information from the external device; and generating a second intent analysis model by adding the evaluation information to learning data and learning the first intent analysis model.

The evaluation information may include any one of positive responses, negative responses, and neutral responses with respect to the response information.

The evaluation information may be determined by analyzing a behavior pattern or a speech pattern of the user.

The generating of the second intent analysis model may include: comparing the number of the positive responses and the number of the negative responses; and assigning a reward according to a result of the comparison.

The generating of the second intent analysis model may include: comparing the number of the positive responses and the number of the negative responses; and assigning a reward according to a result of the comparison.

In the assigning of the reward, when the number of the positive responses is greater than the number of the negative responses, a positive reward may be assigned in proportion to a difference between the number of the positive responses and the number of the negative responses.

In the applying of the reward, when the number of the positive responses is smaller than the number of the negative responses, a negative reward may be assigned in proportion to a difference between the number of the positive responses and the number of the negative responses.

The determining may include: determining reliability of a plurality of candidate utterance intents based on at least one word included in the received speech information detecting the candidate utterance intent having reliability equal to or greater than a preset reference value among the plurality of utterance intents; and determining the detected candidate utterance intent as an utterance intent of the user.

The method may further including the detected candidate utterance intent as the utterance intent of the user.

The method may further include transmitting a control signal to the external device based on the utterance intent having the highest reliability among the plurality of utterance intents.

The response information may include an entity name and the utterance intent.

The method may further include: performing language processing of the speech information to calculate a sentence similarity; calculating a similarity of a candidate corpus stored in a corpus memory with a sentence on which the language processing is performed; and grouping sentences having the calculated similarity equal to or greater than a preset threshold value.

The method may further include retrieving the utterance intent predetermined for each sentence included in the grouped sentences and the evaluation information on the utterance intent.

In the generating of the second intent analysis model, the first intent analysis model may be learned by adding the evaluation information on the utterance intent predetermined for each sentence included in the grouped sentences.

In another general aspect of the present invention, there is provided a response error improving method of an intelligent device, the method comprising: receiving an inquiry of a user; analyzing an intent of the inquiry; analyzing an intent of the inquiry; outputting a response to the inquiry; inputting reaction of the user to the inquiry; determining whether a response desired by the user is output by analyzing the reaction of the user; inputting the inquiry, the response, and the reaction of the user as input data into a learning unit; and uploading a learning result of the learning unit to a database.

The analyzing of the intent of the inquiry may further include extracting at least one intent; and calculating a score representing how much the intent of the inquiry and the extracted at least one intent are correlated.

The analyzing of the intent of the inquiry may further include arranging the intents in descending order of scores of the intents; and selecting an intent having a highest score among the intents.

The outputting of the response to the inquiry may include extracting a response corresponding to the intent having the highest score; and outputting the response in a form of a speech or a text.

The reaction of the user may include at least one of a gesture, a facial expression, and an uttered speech of the user.

The determining of whether the response desired by the user is output may further include classifying the reaction of the user as one of positive, neutral, and negative.

The inputting into the learning unit may further include: adding up reactions of the user classified as positive, neutral, and negative; determining whether a number of reactions classified as positive, a number of reactions classified neutral, and a number of reactions classified negative are respectively equal to or greater than a preset threshold value; and, when the number of reactions classified as positive, the number of reactions classified neutral, and the number of reactions classified negative are respectively equal to or greater than a preset threshold value, classifying the response, which has induced the classified reactions of the user, and intents linked to the response as input data.

The inputting into the learning unit may further include: pairing a question and a solution, wherein the question is the inquiry of the user and the solution is the reactions of the user, the response which has induced the reactions, and the intents linked to the response; and classifying the pair as input data.

The inputting into the learning unit may further include: calculating a ratio of reactions of the user classified as negative to reactions of the user classified as positive among the reactions of the user classified as positive, neutral, and positive; and imposing a penalty to an intent and a response, regarding which there is a high ratio of the reactions of the user classified as negative.

The analyzing of the intent of the inquiry may further include analyzing the intent by adding an extra score to an intent matching semantics of the inquiry, and the penalty may be a penalty which is subtraction of the ratio of the reactions of the user classified as negative from the score.

The method may further include, after the imposing of the penalty, arraigning the intents in descending order of scores of the intents; extracting a response corresponding to the intent having the highest score among the intents; and outputting the response to the user.

The inputting into the learning unit may further include uploading a learning result of the learning unit to a database.

The analyzing of the intent of the inquiry may further include preparing similar inquires having semantics or content similar to semantics or content of the inquiry; and analyzing an intent of each of the similar inquiries.

The analyzing of the intent of each of the similar inquiries may further include: extracting at least one intent; and calculating a score representing how much a similar inquiries and the extracted intent are correlated.

The outputting of the response to the inquiry may further include outputting a response to the intent having the highest score.

The inputting of the reaction of the user to the response may further include inputting reaction of the user to the similar inquiry, and the reaction may include at least one a gesture, a facial expression, and an uttered speech of the user.

The determining of whether the response desired by the user is output may further include classifying the reaction of the user as one of positive, neutral, and negative.

The inputting into the learning unit may further include: pairing a question and a solution, wherein the question is the inquiry of the user and the solution is the reactions of the user, the response which has induced the reactions, and the intents linked to the response; and classifying the pair as input data.

A method for determining an utterance intent based on artificial intelligence and an intelligent device according to an embodiment of the present disclosure have effects as follows.

The present disclosure may learn an accurate utterance intent by itself even without effort correction by a manager.

In addition, the present disclosure may learn a deep learning model according to evaluation of a user on the determined utterance intent.

In addition, the present disclosure may inquire at least one utterance intent predetermined for similar speech information, and enhance learning speed of the deep learning model with use of evaluation information of the user on each utterance intent.

Effects which may be obtained by the present invention are not limited to the aforementioned effects, and other technical effects not described above may be evidently understood by a person having ordinary skill in the art to which the present invention pertains from the following description.

An intelligent device according to the present disclosure may automatically detect whether the intelligent device provide an appropriate response to a user based on a gesture, and a voice.

When the intelligent device according to the present disclosure is used, a manager does not need to review logs in a server where response history is stored, find a case where an intent of the user's inquiry is wrongly analyzed, and tag a right answer: instead, the intelligent device may analyze reaction of the user by itself and determine and learn a response error, and therefore, the manager is not needed to improve an error to thereby reduce labor and time.

When the intelligent device according to the present disclosure is used, the intelligent device may automatically find out a wrong intent analytic result from the inquiry of the user, a selected intent, and reaction of the user.

In addition, the intelligent device according to the present disclosure may repeatedly find out and learn a case where intent analysis is wrongly performed with respect to the inquiry of a user, and therefore, the intelligent device may determine an accurate intent of the user's inquiry.

In addition, the intelligent device according to the present disclosure may store reaction of the user, and therefore, the function of analyzing the user's intent by the intelligent device may gradually improve.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 14 is a flowchart of a method for generating an intent analysis model using a similar sentence according to an embodiment of the present invention.

FIG. 22 is a diagram showing a state in which a score calculated for extracted intent is calculated by an intelligent device according to the present disclosure.

FIG. 24 is a diagram showing an example in which an intelligent device according to another embodiment of the present invention classifies and digitizes a user's reaction.

The accompanying drawings, included as part of the detailed description in order to help understanding of the present disclosure, provide embodiments of the present disclosure and describe the technical characteristics of the present disclosure along with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
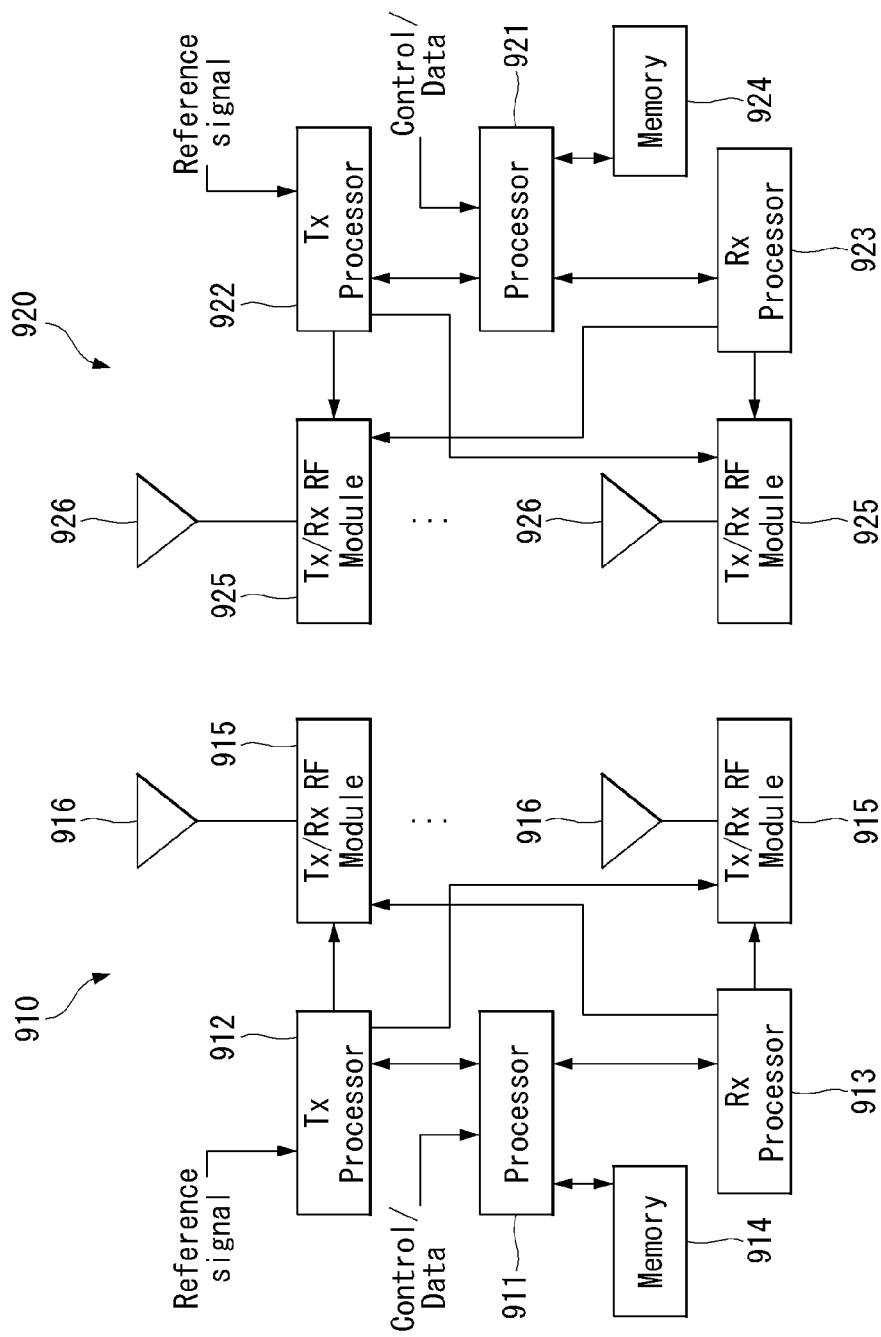
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
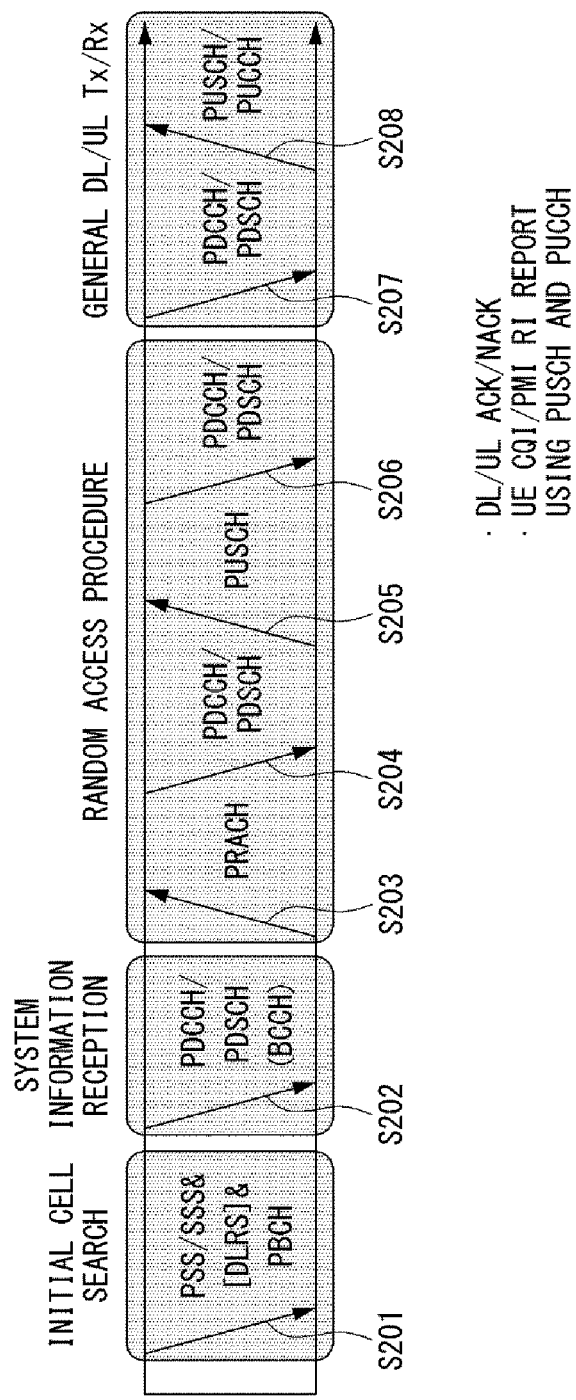
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

Figure 3:
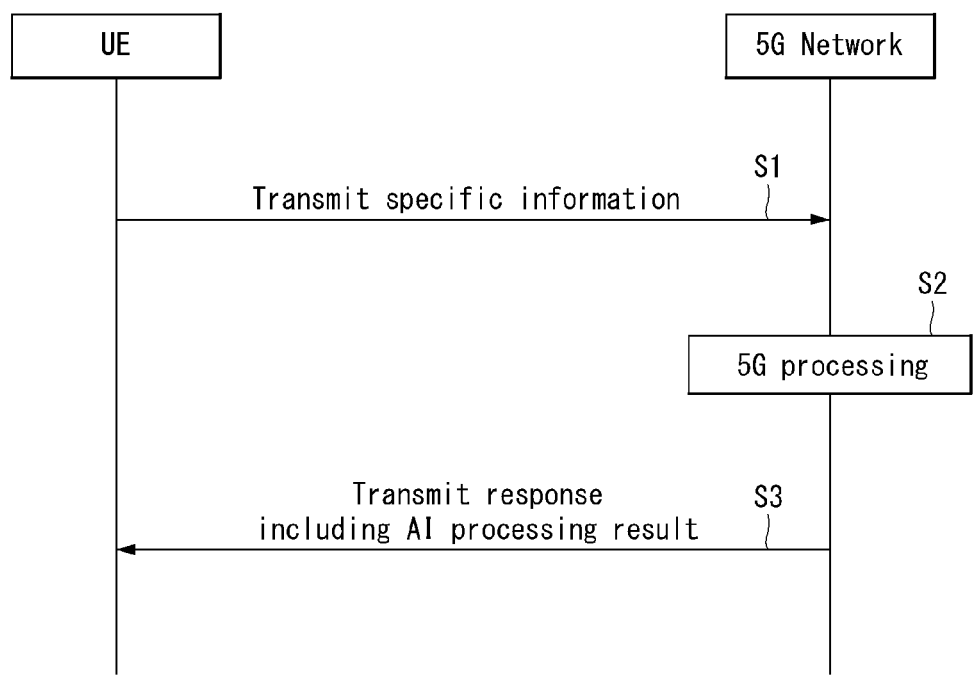
FIG. 3 shows an example of basic operations of an user equipment and a 5G network in a 5G communication system.

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 4:
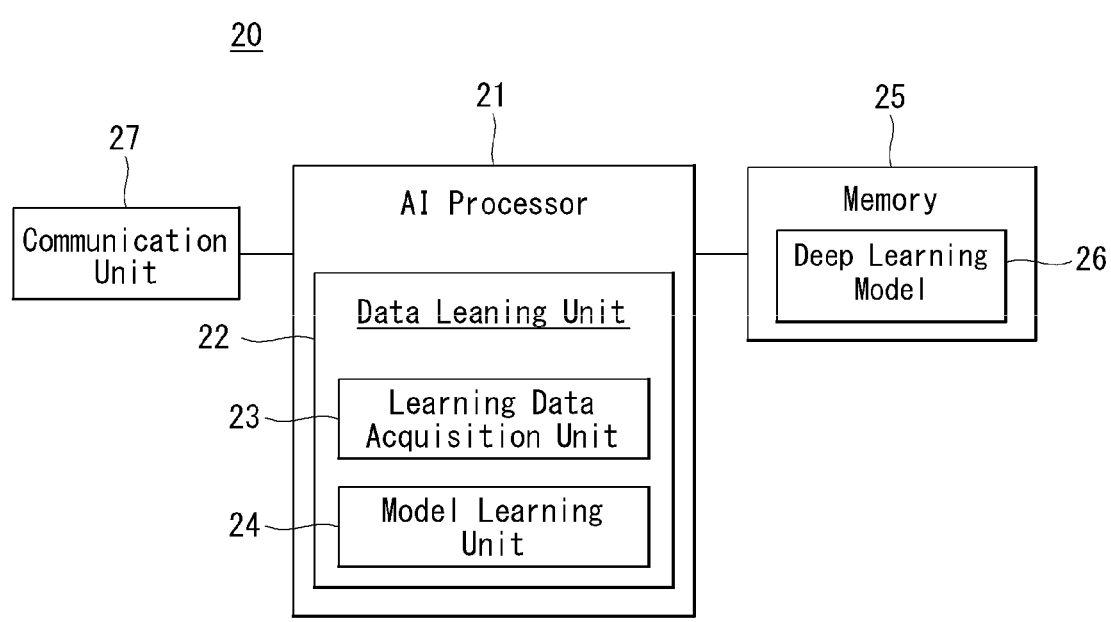
FIG. 4 is a block diagram of an AI device according to an embodiment of the present disclosure.

FIG. 4 is a block diagram of an AI device according to an embodiment of the present disclosure.

An AI device 20 may include an electronic device including an AI module that can perform AI processing, a server including the AI module, or the like. Further, the AI device 20 may be included as at least one component of device disclosed in this disclosure to perform together at least a portion of the AI processing.

The AI processing may include all operations related to driving of the device disclosed in this disclosure. For example, an AI device can perform operations of processing/determining, and control signal generating by performing AI processing on sensing data or external data. Further, for example, an AI device can perform speech recognition or speech synthesis by performing AI processing on data acquired through interaction with other electronic devices included in AI device.

The AI device 20 may include an AI processor 21, a memory 25, and/or a communication unit 27.

The AI device 20, which is a computing device that can learn a neural network, may be implemented as various electronic devices such as a server, a desktop PC, a notebook PC, and a tablet PC.

The AI processor 21 can learn a neural network using programs stored in the memory 25. In particular, the AI processor 21 can learn a neural network for recognizing data related to vehicles. Here, the neural network for recognizing data related to vehicles may be designed to simulate the brain structure of human on a computer and may include a plurality of network nodes having weights and simulating the neurons of human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present disclosure.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 4 was functionally separately described into the AI processor 21, the memory 25, the communication unit 27, etc., but it should be noted that the aforementioned components may be integrated in one module and referred to as an AI module.

Figure 5:
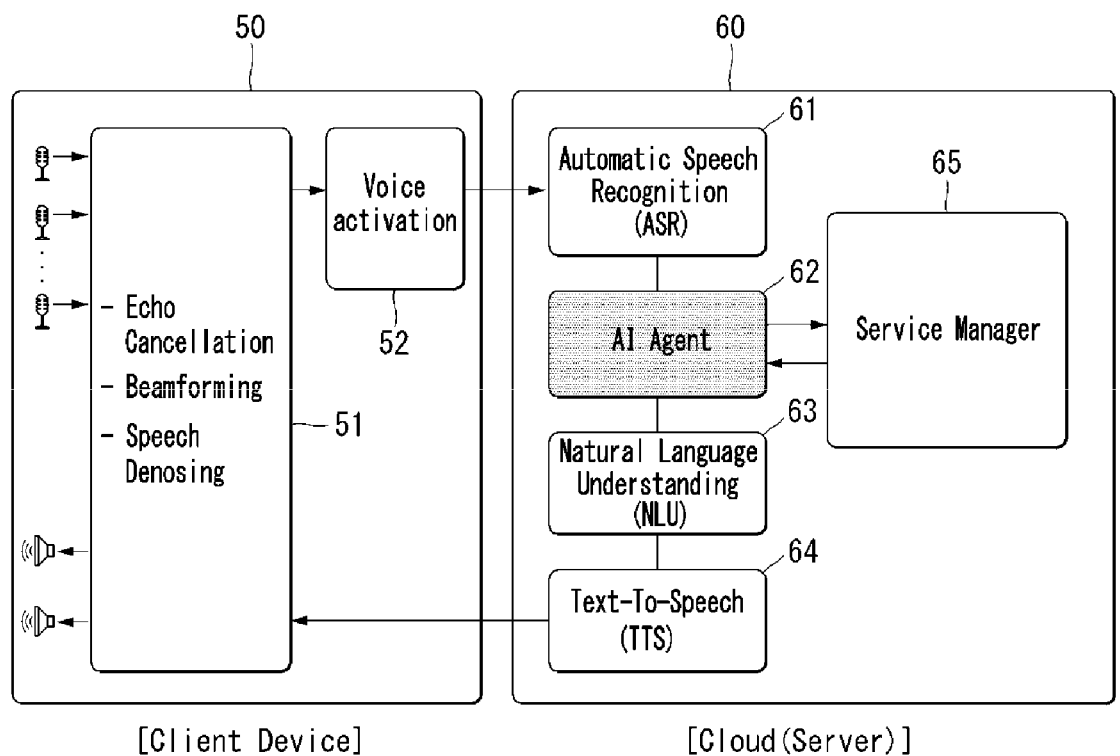
FIG. 5 shows a schematic block diagram of a text-to-speech (TTS) device in a TTS system according to an embodiment of the present invention.
Figure 6:
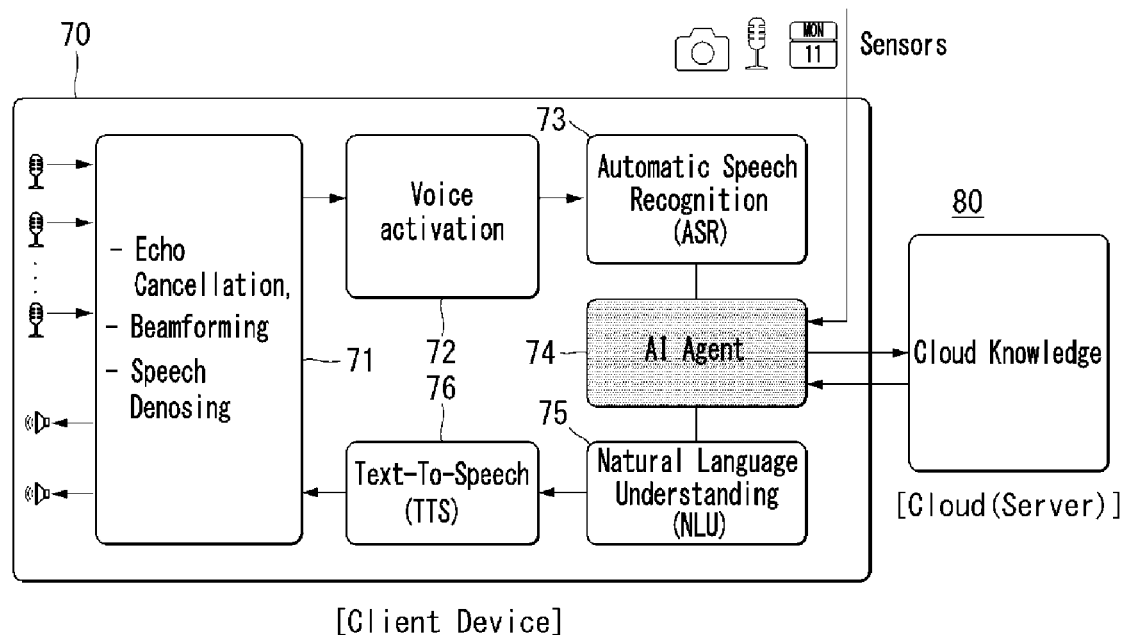
FIG. 6 is a schematic block diagram of a TTS device in a TTS system environment according to an embodiment of the present invention.

In FIGS. 5 and 6, the device environments 70 may be referred to as client devices, and the cloud environments 60 and 80 may be referred to as servers.

FIG. 5 shows a schematic block diagram of a text-to-speech (TTS) device in a TTS system according to an embodiment of the present invention.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exists as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intent deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present invention is not limited thereto, and the speech synthesis process may be performed on the client side (see FIG. 4).

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 5, an example in which the AI agent 62 is implemented in the cloud environment due to computing calculation, storage, power limitations, and the like, but the present invention is not limited thereto.

For example, FIG. 6 is identical to what is shown in FIG. 5, except for a case where the AI agent is included in the cloud device.

FIG. 6 is a schematic block diagram of a TTS device in a TTS system environment according to an embodiment of the present invention. A client device 70 and a cloud environment 80 shown in FIG. 6 may correspond to the client device 50 and the cloud device 60 aforementioned in FIG. 5, except for some configurations and functions. Accordingly, description about specific functions of corresponding blocks may refer to FIG. 5.

Referring to FIG. 6, the client device 70 may include a pre-processing module 51, a voice activation module 72, an ASR module 73, an AI agent 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 6 may refer to FIG. 5. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 5 and 6 are merely an example for explaining a speech processing procedure, and modules more or less than in FIGS. 5 and 6 may be included. In addition, two or more modules may be combined or different modules or modules with different arrangement structures may be included. The various modules shown in FIGS. 5 and 6 may be implemented in hardware, software instructions for execution by one or more processors, firmware, including one or more signal processing and/or application specific integrated circuits, or a combination thereof.

Figure 7:
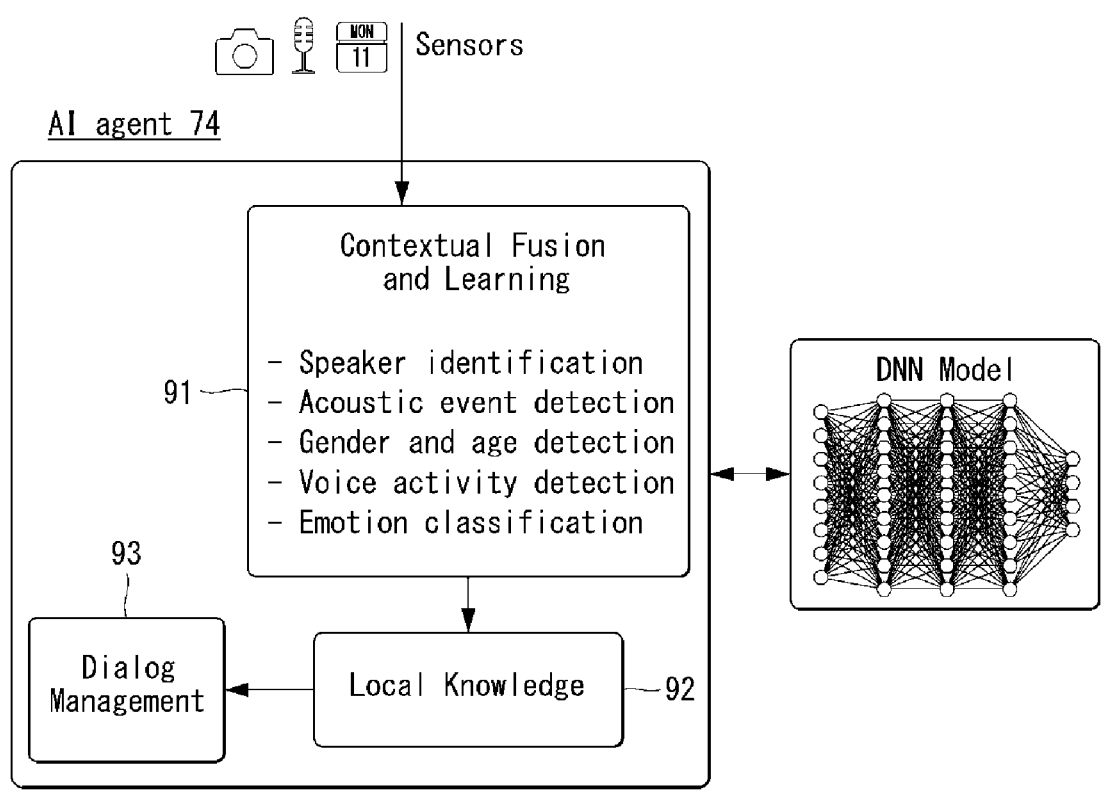
FIG. 7 is a schematic block diagram of an AI agent capable of performing emotion classification information-based TTS according to an embodiment of the present invention.

FIG. 7 is a schematic block diagram of an AI agent capable of performing emotion classification information-based TTS according to an embodiment of the present invention.

Referring to FIG. 7, in the speech processing procedure described with reference to FIGS. 5 and 6, the AI agent 74 may support an interactive operation with a user, in addition to an ASR operation, an NLU operation, and a TTS operation. Alternatively, using context information, the AI agent 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 91, a local knowledge 92, and a dialogue management 93.

The context fusion and learning module 91 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be acquired through the above-described DNN model.

The AI agent 74 may include the local knowledge 92. The local knowledge 92 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party", the AI agent 74 does not request more clarified information from the user and may utilize the local knowledge 92 to determine who "the friends" are and when and where the "birthday" takes place.

The AI agent 74 may further include the dialogue management 93. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

Figure 8:
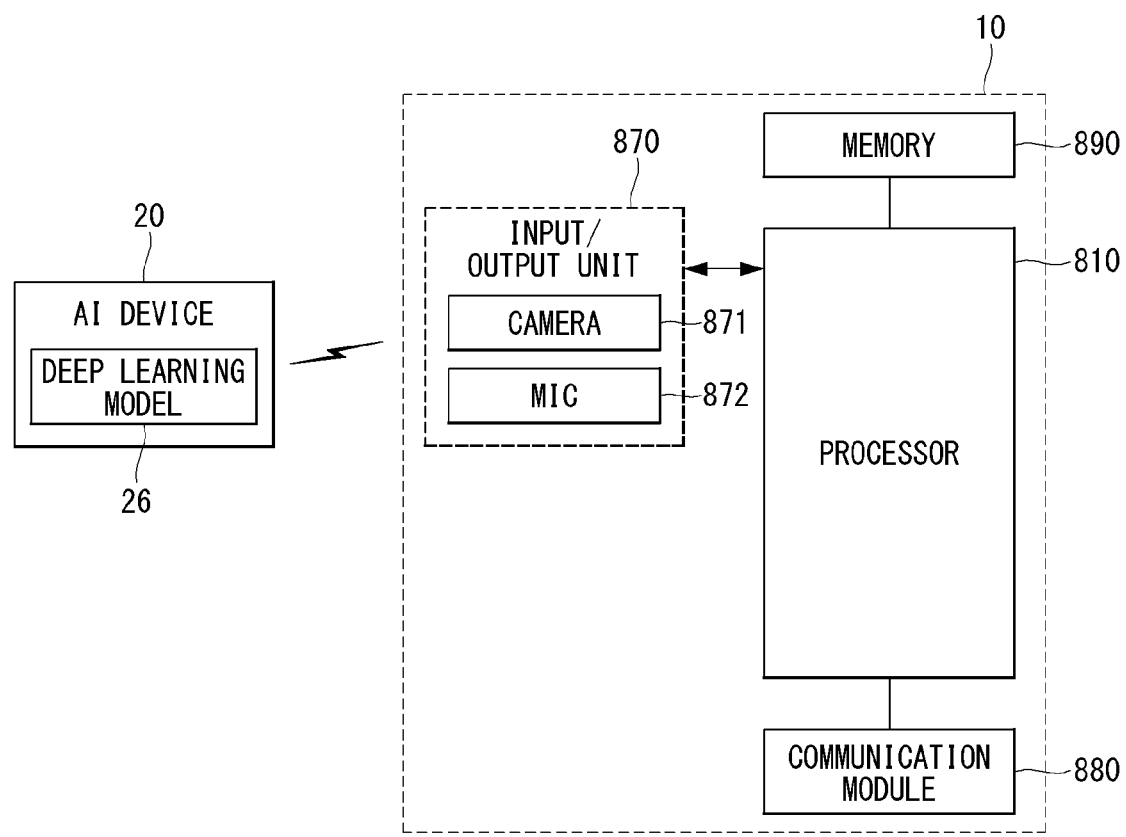
FIG. 8 is a block diagram showing an external device according to an embodiment of the present disclosure.

FIG. 8 is a block diagram showing an external device according to an embodiment of the present disclosure.

An external device 10 may include a processor 810, an input/output unit 870, a communication module 880, and a memory 890.

The external device 10 may include an autonomous vehicle, a robot, a drone, an AR device, a mobile device, a home appliance, etc. The external device 10 may receive AI-processed information from an external server 20 or a network or may perform AI processing through an AI module embedded in the external device.

The processor 810 may input acquire speech information to pre-learned first intent analysis model, determine a user's utterance intent according to an output value of the first intent analysis model, and output a response message based on response information corresponding to the determined utterance intent through a display or a speaker.

The processor 810 may receive evaluation information of the user, store the evaluation information in a memory, and learn the first intent analysis by setting the stored evaluation information as learning data to thereby generate a second intent analysis model.

The processor 810 may generate evaluation information by analyzing a behavior pattern or a speech pattern of the user, and the evaluation information includes any one of positive responses, negative responses, and neutral responses.

The processor 810 may retrieve positive responses, negative responses, and neutral responses, calculate the number of the positive responses, the number of the negative responses, and the number of the neutral responses, and determine whether the number of the positive responses, the number of the negative responses, and the number of the neutral responses is equal to or greater than a preset threshold value. The processor may compare the number of positive responses and the number of negative responses, and apply a reward to an intent analysis model according to a result of the comparison. The number of positive responses and the number of negative responses may be compared, if the number of positive responses is greater than the number of negative responses, a positive reward is applied, and, if the number of negative responses is greater than the number of positive responses, a negative reward is applied.

The processor 810 may detect a plurality of candidate utterance intents using at least one word included in speech information of the user, and determine reliability of the plurality of detected candidate utterance intents.

The input/output unit 870 may include a camera 871 and an MIC 872.

The camera 871 processes a still image or a moving image acquired by an image sensor. An image frame processed by the camera 871 may be stored in the memory or may be transmitted to an external device through a wireless communication module. In addition, location information and the like of the user may be calculated from an image frame acquired by the camera 871. Two or more cameras 871 may be provided according to a use environment.

The MIC 872 receives an external acoustic signal through a microphone in a speech mode, and process the external acoustic signal into electric speech data. The process speech data may be output after being converted into a form to be transmitted to a base station through a communication module. In the MIC, various noise reduction algorithms for removing noises occurring in the course of receiving the external acoustic signal may be implemented.

The communication module 880 may perform a communication connection operation with an external server or a network. The processor 810 may receive information AI-processed by the AI device 20 through the communication module 880.

The memory 890 may store evaluation information of the user. In addition, the memory 890 may store a second intent analysis model that is generated by learning a first intent analysis model by setting the stored evaluation information as learning data.

Figure 9:
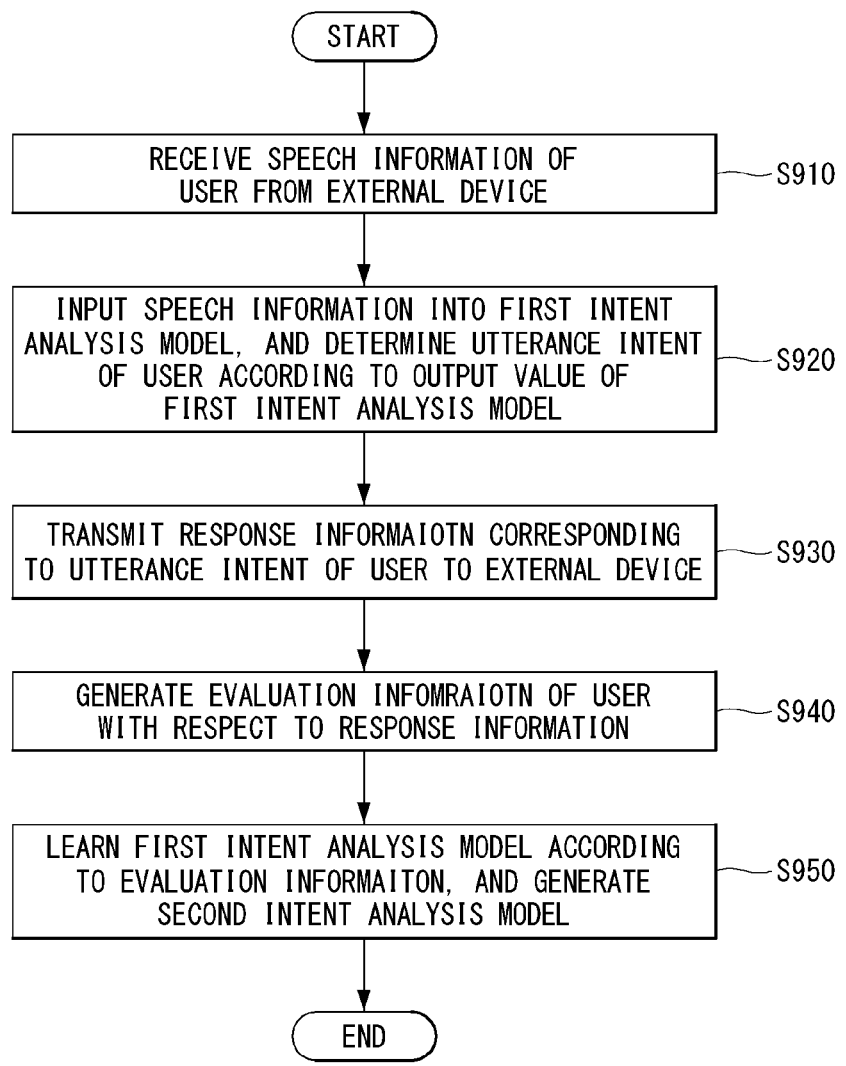
FIG. 9 is a flowchart of a method of generating an intent analysis model to evaluate an utterance intent according to an embodiment of the present disclosure.

FIG. 9 is a flowchart of a method of generating an intent analysis model to evaluate an utterance intent according to an embodiment of the present disclosure.

Referring to FIG. 9, the processor may receive speech information of a user from an external device through the communication module (S910).

The external device may receive a utterance speech signal of the user through the MIC, and transmit speech information to the server. In an embodiment of the present disclosure, the external device may perform intent analysis on utterance of the user through a speech recognition module embedded in the external device.

The processor may input the speech information into a first intent analysis model and determine utterance intent of the user according to an output value of the first intent analysis model (S920).

The speech information may include text information of utterance of the user. The speech information may be a text that is generated based on a speech input of the user using at least one speech recognition technology from among Speech To Text (STT), Automatic Speech Recognition (ASR), Spoken Language Understanding (SLU), and Natural Language Understanding (NLU). However, the speech information is not limited to the text.

In the present disclosure, the speech information may refer to the semantics of an uttered speech analyzed using a speech recognition technique. Recognition information may be a text generated from a speech input of the user using an STT technique. In addition, the speech information may be one of a purpose, an object, a data, a location, and a message to represent intent of the user. In addition, at least one item for representing intent of the user may be combined in the form of a tag in an entity name of a character. However, an item included in the speech information is not limited thereto.

According to an embodiment of the present disclosure, the processor may input speech information into the first intent analysis model in response to a speech input of the user, and determine utterance intent of the user according to an output value of the first intent analysis model. Specifically, the processor may generate a candidate utterance intent for the speech input of the user, and measure a score of reliability of the candidate utterance intent through the intent analysis model. The processor may detect at least one candidate utterance intent, and generate a candidate list including each utterance intent and a corresponding score thereof. Based on a score which indicates reliability, the processor may determine a candidate utterance intent having the highest reliability in the candidate list as utterance intent for the speech input of the user.

The first intent analysis model may be an artificial neural network model that is supervised learned by setting the speech information of the user and utterance intent corresponding to the speech information as learning data.

The processor may transmit response information corresponding to the determined utterance intent of the user to the external device (S930).

The response information may refer to digital information that is provided to the user to identify whether a speech input corresponds to intent of the user. The response information may be provided to a user in the form of at least one of a text, an image, a speech, or a moving image or a combination of two or more thereof. However, the form of the response information is not limited thereto. The response information may include an entity name and an utterance intent.

The processor may generate evaluation information of the user for the response information from the external device through the communication module (S940).

The evaluation information may refer to digital information extracted from reaction of the user to the response information. The user may express a specific operation or speech with respect to the response information, and the external device may acquire information on such reaction of the user through the input/output unit. The server may receive the information on the reaction of the user from the external device, and generate evaluation information of the user for utterance intent determined based on the reaction of the user.

The evaluation information may include any one of a positive response, a negative response, or a neutral response of the user to the response information.

The evaluation information may be determined by analyzing a behavior pattern or a speech pattern of the user. Specifically, the processor may generate evaluation information of the user using the user's facial expression, gesture, gaze, etc. acquired from the external device. In addition, the processor may generate the evaluation information of the user through a speech input of the user.

For example, if the user frowns, the processor may determine evaluation of the user as a negative response based on image information, and, if the user smiles, the processor may determine evaluation of the user as a positive response based on image information.

In another example, if the user says "this is not true" with respect to response information, the processor may determine evaluation of the user as a negative response according to the speech input of the user, and, if the user says "okay", the processor may determine evaluation of the user as a positive response according to the speech input of the user. The processor may store <user's speech input, utterance intent, and user's evaluation information> in the memory.

The processor may add the evaluation information to learning data, and generate a second intent model by learning the first intent model (S950).

The processor may learn the first intent analysis model by setting learning data including the evaluation information. Specifically, as described above, the processor may learn the first intent analysis model by setting <user's speech input, utterance intent, user's evaluation information> stored in the memory as learning data. A detailed learning method will be described in FIG. 10.

The processor may generate a second intent analysis model that is learned through learning data including evaluation information, and store the generated second intent analysis model in the memory.

As such, by learning the existing first intent analysis model using the user's evaluation on an utterance intent analytic result, the processor may determine a reliable utterance intent that is close to the user's actual intent.

Figure 10:
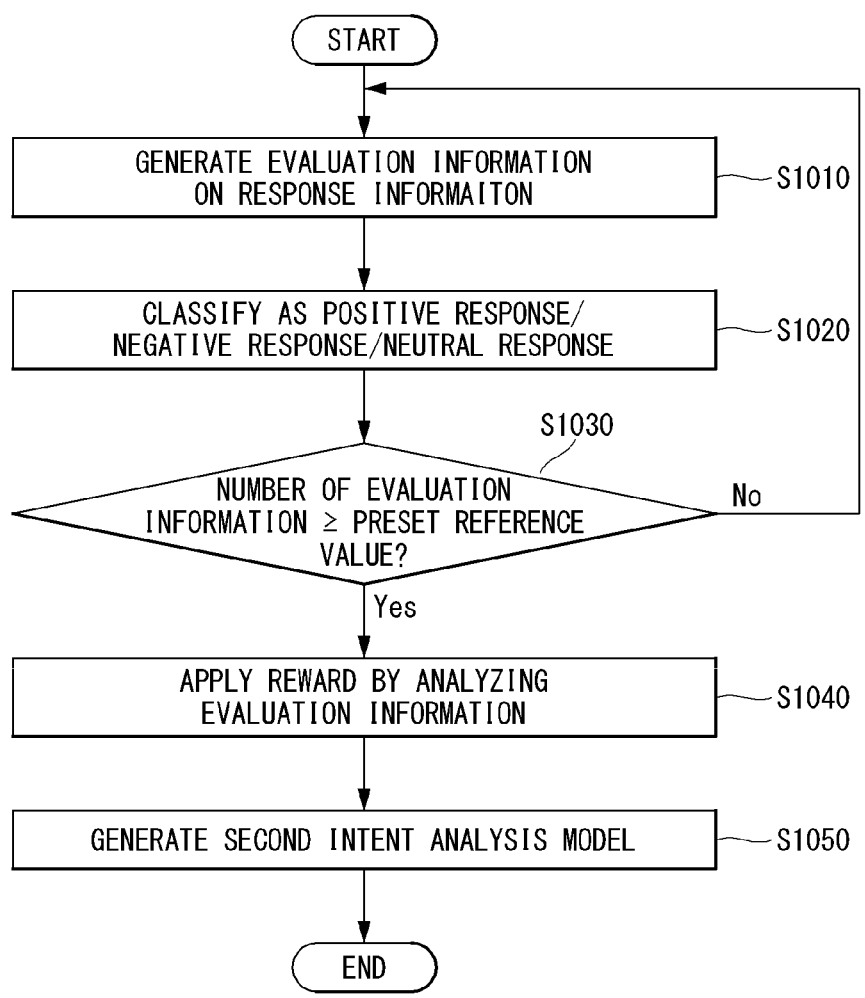
FIG. 10 is a flowchart showing a method for learning an intent analysis model according to an embodiment of the present disclosure.

FIG. 10 is a flowchart showing a method for learning an intent analysis model according to an embodiment of the present disclosure.

Referring to FIG. 10, as described above, the processor may generate evaluation information of the user for response information transmitted to the external device through the communication module (S1010).

The processor may classify the evaluation into three categories by analyzing a speech and/or a behavior (e.g., gesture) of the user (S1020).

The categories of the evaluation information may include any one of a positive response, a negative response, and a neutral response of the user to the response information.

The evaluation information may be determined by analyzing a behavior pattern or a speech pattern of the user. Specifically, the processor may generate evaluation information of the user using a facial expression, a gesture, a gaze, etc. of the user acquired from the external device. In addition, the processor may generate evaluation information of the user through a speech input of the user.

For example, the processor may utilize a well-known emotion discriminant model to generate evaluation information of the user. An emotional state of the user may be determined based on the user's facial expression of speech information of the emotion discriminant model. The emotional state of the user may be classified into seven categories consisting of anger, hatred, fear, happiness, sadness, surprise, and neutrality. The emotional state of the user may be classified in more detail on the basis of a human behavior unit, but may be classified into seven universal emotions that humans feel daily. In this case, the processor may classify an emotional state other than happiness and neutral as a negative response, classify happiness as a positive response, and classify neutrality as a neutral response, but a classification method is not limited thereto.

In another example, if the user frowns, the processor may determine evaluation of the user as a negative response based on image information, and, if the user smiles, the processor may determine evaluation of the user as a positive response based on image information.

In yet another example, if the user says "this is not true" with respect to response information, the processor may determine evaluation of the user as a negative response according to the speech input of the user, and, if the user says "okay", the processor may determine evaluation of the user as a positive response according to the speech input of the user. The processor may store <user's speech input, utterance intent, and user's evaluation information> in the memory.

The processor may determine whether a total number of evaluations in each category of the evaluation information of the user is equal to or greater than a reference value (S1030).

The processor may perform control to learn the first intent analysis model using corresponding information only when the evaluation information of the user is sufficiently accumulated. Specifically, the processor may determine whether a total number of each category of positive responses, negative responses, and neutral responses are respectively equal to or greater than a preset reference value. The processor learns the first intent analysis model when a total number of each category of responses forming the evaluation information is equal to or greater than the preset reference value.

If the number of evaluation information is less than a preset threshold value, the processor does not perform learning of the first intent analysis model and collect more evaluation information of the user.

If the number of each evaluation category forming the evaluation information is equal to or greater than a preset reference value, the processor may analyze the evaluation information and apply a reward to the first intent analysis model (S1040).

The processor may compare the number of positive responses and the number of negative responses by analyzing the evaluation information. If the number of positive responses is greater than the number of negative responses, the processor may apply a positive reward to a deep learning model in proportion to a difference between the number of positive responses and the number of negative responses. In addition, if the number of negative responses is greater than the number of positive responses, the processor may apply a negative reward to a deep learning model in proportion to a difference between the number of positive responses and the number of negative responses.

In an embodiment of the present disclosure, if the number of neutral responses is greater than a sum between the number of positive responses and the number of negative responses even though the number of evaluation information is equal to or greater than a preset reference value, the processor may stop collecting a negative response and additionally collect data of <user's speech input, utterance intent, user's evaluation information> until the number of positive responses and negative responses reaches the number of neutral responses.

The processor may generate a second intent analysis model based on the applied reward (S1050).

The processor may perform supervised learning or reinforcement learning of a deep learning model based on a positive reward and/or a negative reward, and store the learned second intent analysis model in the memory.

Figure 11:
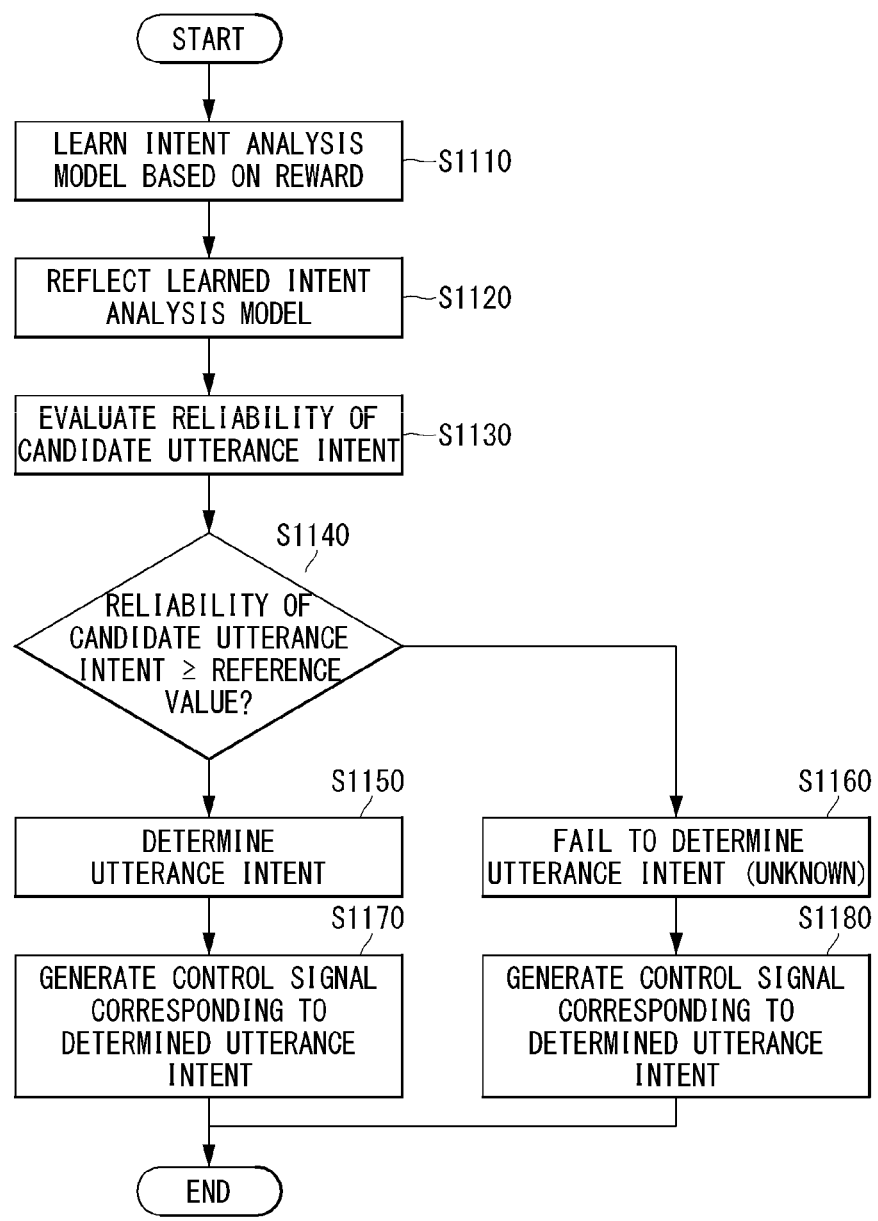
FIG. 11 is a flowchart of a method for determining one of a plurality of utterance intents when the plurality of utterance intent is detected, according to an embodiment of the present disclosure.

FIG. 11 is a flowchart of a method for determining an utterance intent according to an embodiment of the present disclosure.

Referring to FIG. 11, as described above in FIG. 9, the processor may learn a first intent analysis model based on a reward, and generate a second intent analysis model (S1110).

The processor may store the second intent analysis model, and then reflect the second intent analysis model in determining utterance intent (S1120).

The processor may input speech information of a user into the second intent analysis model, and evaluate reliability of a candidate utterance intent according an output value of the second intent analysis model (S1130).

The processor may input speech information of the user into the second intent analysis model, and determine utterance intent of the user according to an output value of the second intent analysis model. In this case, the determined utterance intent may be evaluated to have reliability higher than utterance intent that is determined using the first intent analysis model.

The processor may detect a plurality of candidate utterance intents that are predicted based on the speech information of the user. In this case, the candidate utterance intent may have reliability from 0% to 100%. A score of reliability may be represented by 0 to 1.

The processor may determine whether reliability of the candidate utterance intent is equal to or greater than a preset reference value (S1140).

If the reliability of the candidate utterance intent is equal to or greater than the preset reference value, the processor may determine the candidate utterance intent as utterance intent of the user. If the reliability of the candidate utterance intent is smaller than the preset reference value, the processor may determine that an accurate utterance intent cannot be determined (S1150 and S1160).

The processor may determine whether reliability of candidate utterance intent is equal to or greater than a reference value according to a score corresponding to the reliability, and may exclude candidate utterance intent having reliability smaller than the reference value from the memory. That is, the processor may select at least one candidate utterance intent having reliability equal to or greater than the reference value as utterance intent corresponding to the speech information of the user.

When the utterance intent of the user is determined, the processor may generate a control signal corresponding to the determined utterance intent (S1170).

The control signal may refer to a signal for controlling an external device. The controller may well-known control signals that can be implemented through various intelligent devices to output acoustics through the external device, display a display, control indoor temperature, control air cleanliness, etc.

The processor may transmit a control signal to an external device, corresponding to an object (or an agent) of the control signal, through the communication module.

When utterance intent of the user is not determined, the processor may transmit an utterance intent failure message to the external device (S1180).

When utterance intent is not clear, the processor may determine that the utterance intent is unknown. When the utterance intent is determined to be unknown, the processor may transmit a determination failure message as to utterance intent to the external device or a user terminal.

Figure 12:
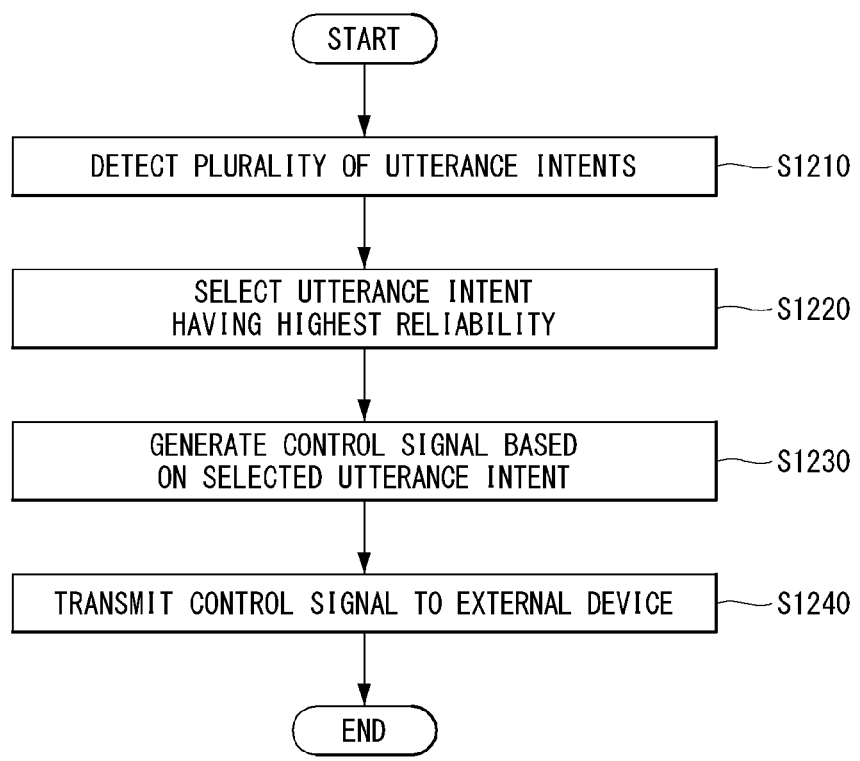
FIG. 12 is a diagram for explaining a method for determining an utterance intent.

FIG. 12 is a flowchart of a method for determining any one of a plurality of utterance intent when the plurality of utterance intent is detected according to an embodiment of the present disclosure.

Referring to FIG. 12, as described above, reliability of candidate utterance intent is determined to be equal to or greater than a preset reference value, and, in this case, the processor may detect a plurality of utterance intents (S1210).

When there is the plurality of utterance intents, the processor may select an utterance intent having the highest reliability among the plurality of utterance intents (S1220).

In the method for determining an utterance intent according to an embodiment of the present disclosure, reliability of the plurality of utterance intents may be changed through re-learning of a deep learning model. For example, even though a reliability score measured through the first intent analysis model is 0.8, a reliability measured through a second intent analysis model which is re-learned by reflecting evaluation information of the user may be reduced to 0.4. Accordingly, even though one utterance intent is initially selected with respect to the same speech information, the initial utterance intent may be ranked to a second position, a third position, or lower as negative responses accumulates, and an utterance intent on the second highest ranking may be selected as utterance intent of the speech information.

The processor may generate a control signal based on the selected utterance intent, and transmit the generated control signal to an external device (S1230 and S1240).

Figure 13:
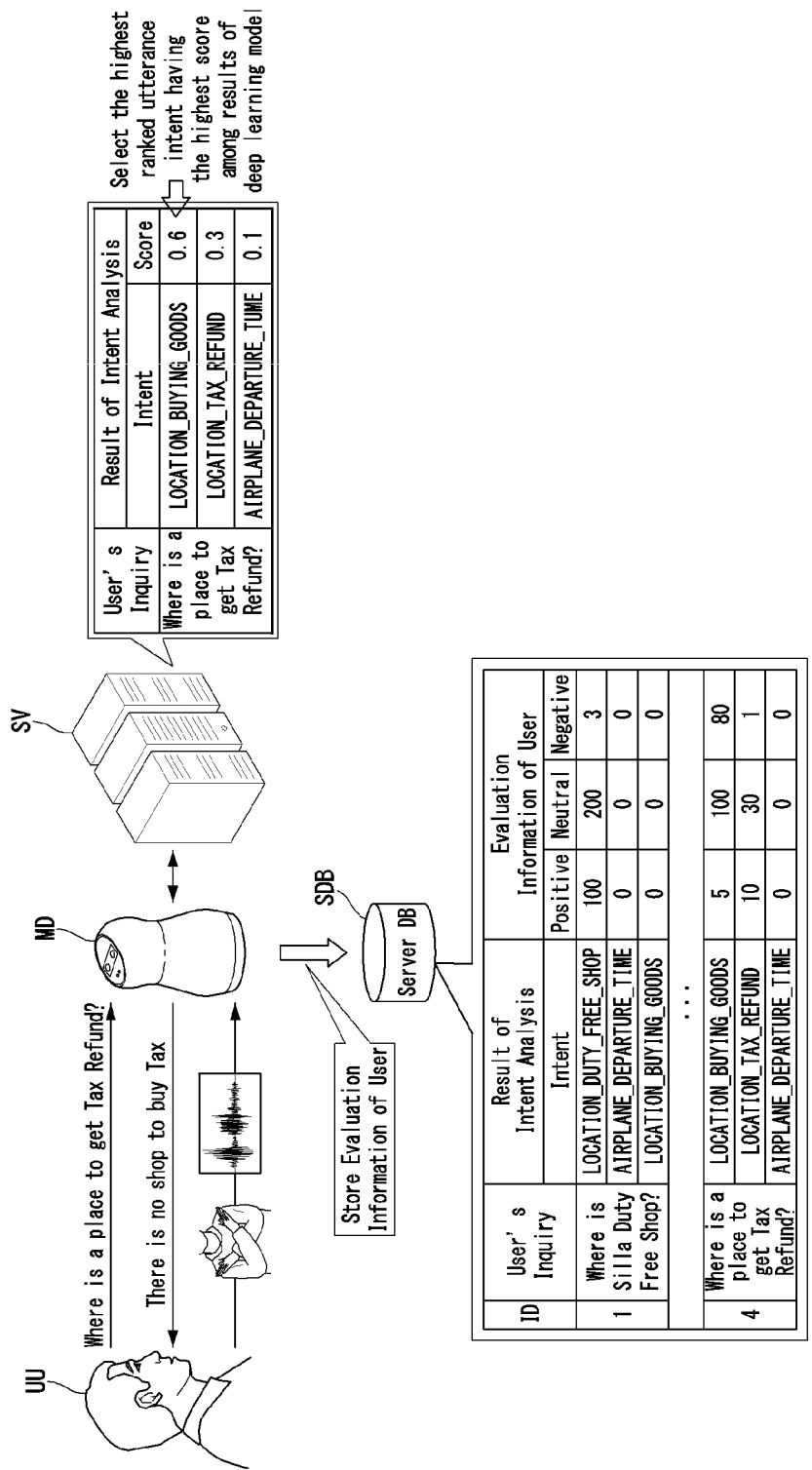
FIG. 13 is a diagram for explaining an example of a method for determining an utterance intent.
Figure 14:
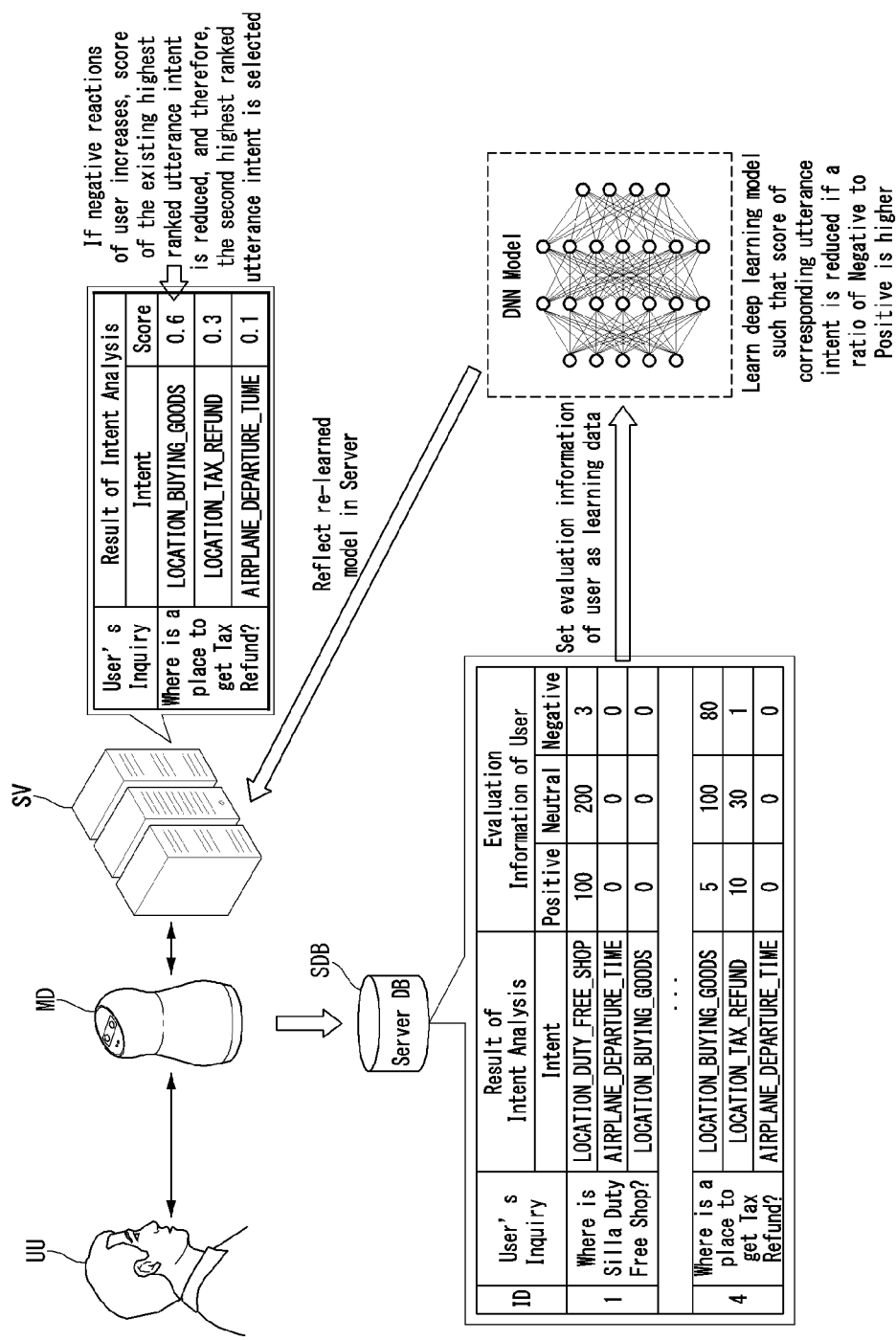
FIG. 14 is a diagram for explaining a process of learning an intent analysis model.

FIG. 13 is a diagram for explaining an example of a method for determining an utterance intent, and FIG. 14 is a diagram for explaining a process of learning an intent analysis model.

A user may input an utterance speech to an external device, and the external device may output a response message according to response information to the user. In this case, the external device may deliver speech information of the user to a server, and the server may generate candidate utterance intents based on the speech information and a list of reliability scores of the candidate utterance intents.

The server may select an utterance intent having the highest reliability score based on the list, and generate response information for the selected utterance intent. The server may transmit the response information to the external device, and the external device may output a response message in accordance with the response information.

The user may react to the response information through a behavior or a speech. The external device may transmit reaction information to the server to generate evaluation information of the user based on reaction information of the user or may transmit evaluation information processed and generated by the external device. The server may store the evaluation information of the user in the memory.

Referring to FIG. 13, the user inputs a speech signal "Where can I get a Tax refund?" through a MIC of an external device. The external device may transmit speech information to a server or may transmit a text sentence "Where can I get a Tax refund?" to the server.

With respect to the sentence "Where can I get a Tax refund?", the server may analyze "LOCATION_BUYING_GOODS", "LOCATION_TAX_REFUND", and "AIRPLANE_DEPARTURE_TIME" as utterance intents.

In addition, the server assigns a reliability score of 0.6 to LOCATION_BUYING_GOODS", a reliability score of 0.3 to "LOCATION_TAX_REFUND", and a reliability score of 0.1 to "AIRPLANE_DEPARTURE_TIME".

The server selects "LOCATION_BUYING_GOODS" as utterance intent of the user based on the reliability score, and the external device may output a message saying "There is no shop to buy TAX" based on the utterance intent.

The user may express a negative response with respect to response information not matching the utterance intent, and each negative response may be stored in the memory with a corresponding utterance intent. In regard with "LOCATION_BUYING_GOODS", there are five positive responses, eighty negative responses, and eighty neutral responses. Since the number of negative responses is greater than the number of positive responses, the reliability score of the utterance intent "LOCATION_BUYING_GOODS" may be expected to be reduced in a step of re-learning an intent analysis model in consideration of evaluation information.

Referring to FIG. 14, an intent analysis model may be learned by reflecting evaluation information of a user, and the processor reflects the re-learned model in the server.

As a result, the reliability score of "LOCATION_BUYING_GOODS" having negative responses seventy five more than positive responses is reduced from 0.6 to 0.5, and the reliability score of "LOCATION_TAX_REFUND" having negative responses and negative responses which are the same in number is 0.5. Since the reliability score of "LOCATION_TAX_REFUND" is greater than the reliability score of "LOCATION_BUYING_GOODS", the processor may select LOCATION_TAX_REFUND" as the utterance intent of the user.

As such, the present disclosure learns a deep learning model so as in a way to determine an utterance intent more suitable for the user from among a plurality of utterance intents based on evaluation information of the user, thereby providing a reliable speech recognition result.

Figure 15:
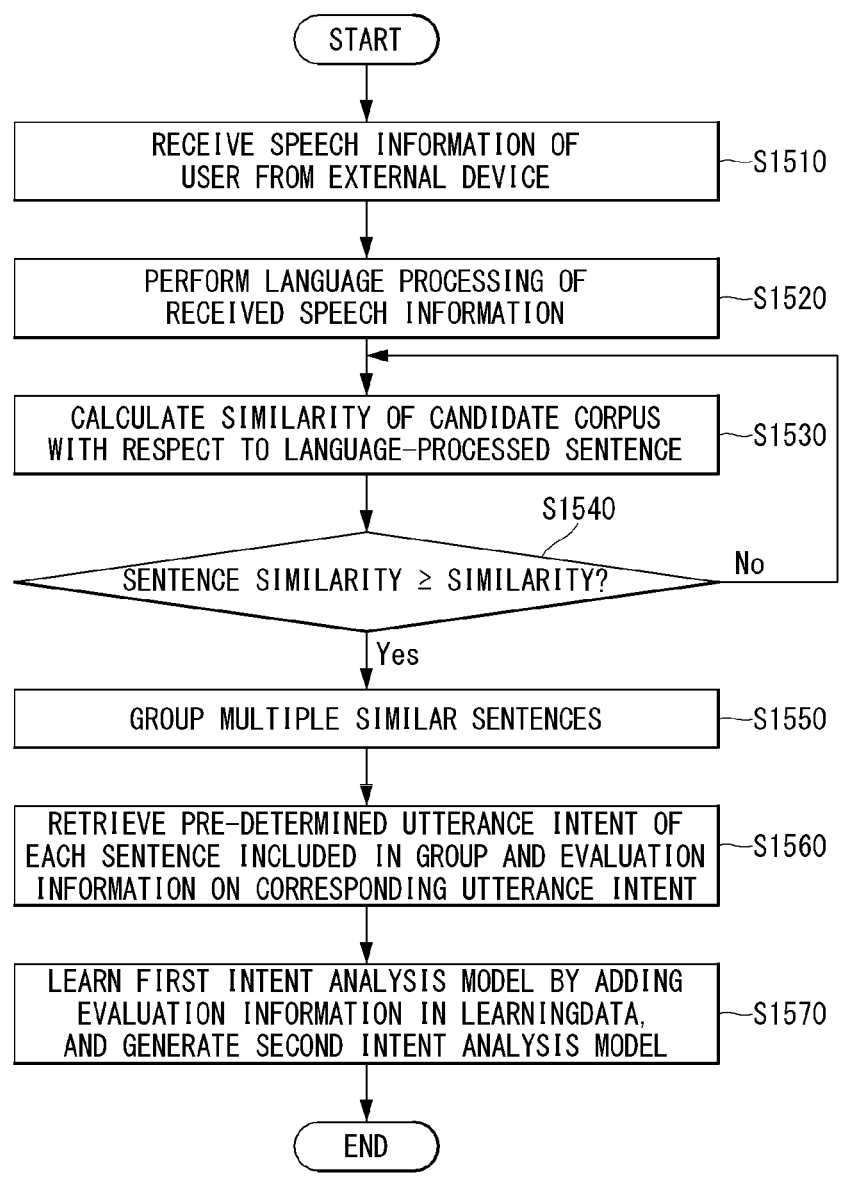
FIG. 15 is a diagram for explaining an example of a process of generating an intent analysis model using a similar sentence.

FIG. 15 is a flowchart of a method of an intent analysis model using a similar sentence according to an embodiment of the present disclosure.

Referring to FIG. 15, the processor may receive speech information of a user from an external device through a communication module (S1510).

The processor may perform language processing of the received speech information (S1520).

The processor may calculate a similarity between a candidate corpus and a language-processed sentence.

The processor may tokenize each word of corresponding sentences. The processor may vectorize a tokenized word through a word embedding technology using at least one technique of Word2vec, AdaGram, FasText, or Doc2vec, and may measure a similarity between features of words through computation of a weight between the features of the respective words.

The processor may retrieve a sentence of which a similarity with a language-processed sentence is equal to or greater than a preset reference value (S1540).

The processor may group sentences having such a similarity equal to or greater than the preset reference value (S1550).

The processor may retrieve a predetermined utterance intent of each sentence included in a group, and evaluation information on the utterance intent (S1560).

The processor may calculate the number of positive responses, the number of negative responses, and the number of neutral responses by adding up evaluation information on the predetermined utterance intent of each sentence.

The processor may generate a second intent analysis model by adding the evaluation information on the retrieved utterance intent and learning a first intent analysis model (S1570).

As such, in the method for determining an utterance intent according to an embodiment of the present disclosure, evaluation information of the user may be acquired quickly through grouping of similar sentences, and an intent analysis model may be improved fast.

Figure 16:
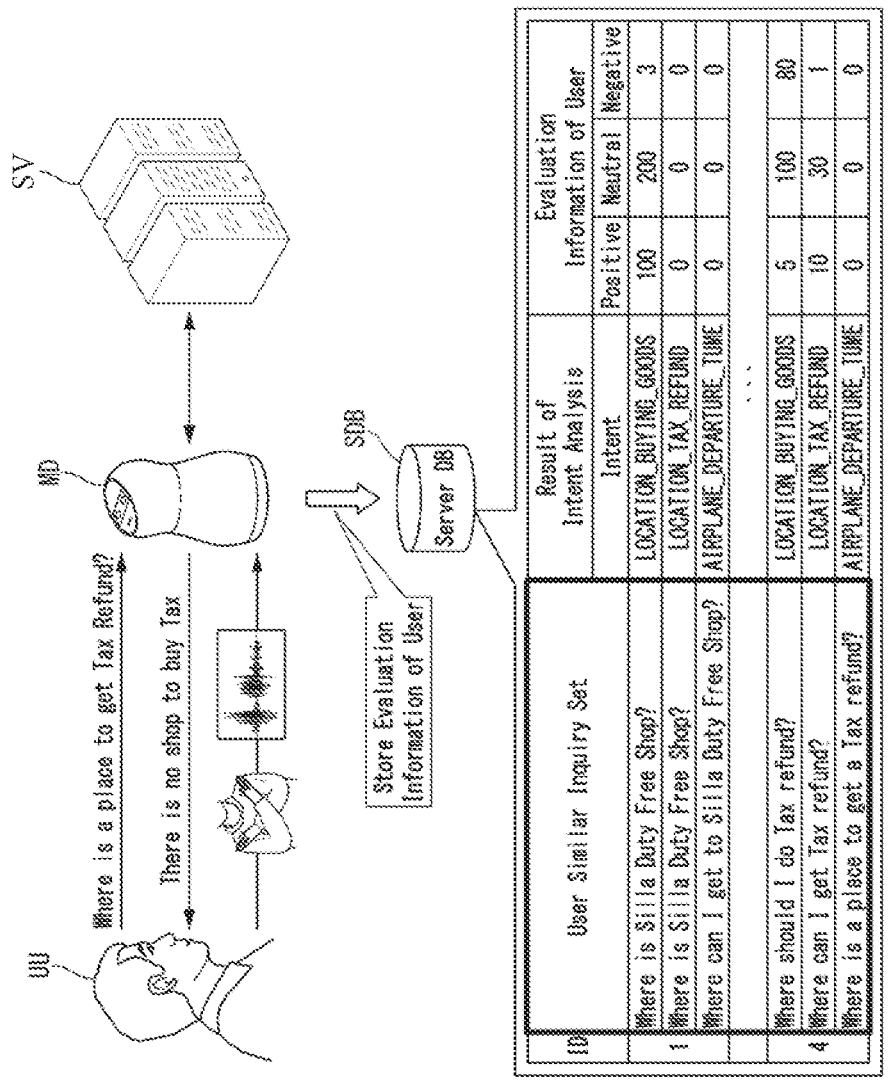
FIG. 16 is a flowchart of an example of performing a method for determining an utterance intent through AI processing.

FIG. 16 is a diagram showing an example of a process of generating an intent analysis model using a similar sentence.

Referring to FIG. 16, speech information of a user may include "Where is Silla Duty Free Shop?", Where can I get to Silla Duty Free Shop?", "Where should I do Tax refund?", "Where can I get Tax refund?", and "Where is a place to get a Tax refund?".

The processor may group similar sentences into one similar sentence group through similarity analysis of the similar sentences. Evaluation information of the user in the similar group is calculated as follows: evaluation information of the user for "LOCATION_DUTY_FREE_SHOP" includes 100 positive responses and three negative responses, evaluation information of the user for "AIRPLANE_DEPARTURE_TIME" includes three positive responses and seventy negative responses, evaluation information of the user for "LOCATION_BUYING_GOODS" includes four positive responses and seventy negative responses, and evaluation information of the user for "LOCATION_TAX_REFUND" includes 100 positive responses and five negative responses.

Based on the number of positive responses and the number of negative responses in the evaluation information, positive rewards are assigned to "LOCATION_TAX_REFUDN" and "LOCATION_DUTY_FREE_SHOP" whereas negative rewards are assigned to "LOCATION_BUYING_GOODS" and "AIRPLANE_DEPARTURE_TIME"

As such, by calculating the number of evaluation information using a similar group, the processor may quickly learn a deep learning model which excludes an intent analysis result that does not match the utterance intent of the user.

Figure 17:
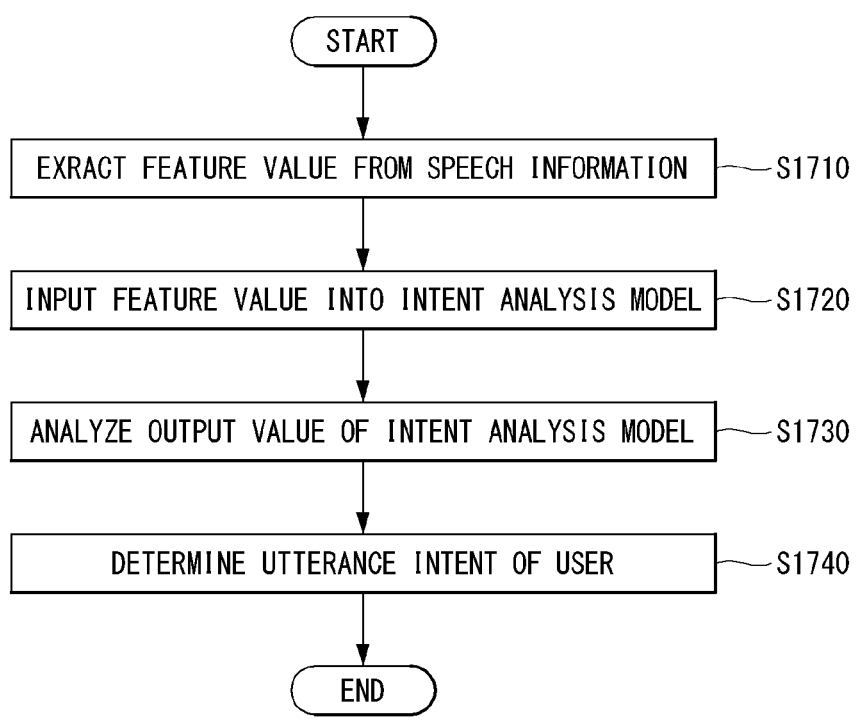
FIG. 17 is a flowchart of an example of performing a method for determining an utterance intent through AI processing of a 5G network.

FIG. 17 is a flowchart of an example in which a method for determining an utterance intent is performed through AI processing.

The processor may extract a feature value from speech information of a user (S1810).

The processor may input the extracted feature value into a pre-learned artificial neural network (ANN) (S1720).

The artificial neural network may be pre-learned to receive a feature value extracted from speech information of the user and generate utterance intent information of the user as an output.

The processor may analyze an output value of the artificial neural network (S1730).

The processor may determine a reliable utterance intent of the user using the output value of the artificial neural network (S1740).

Figure 18:
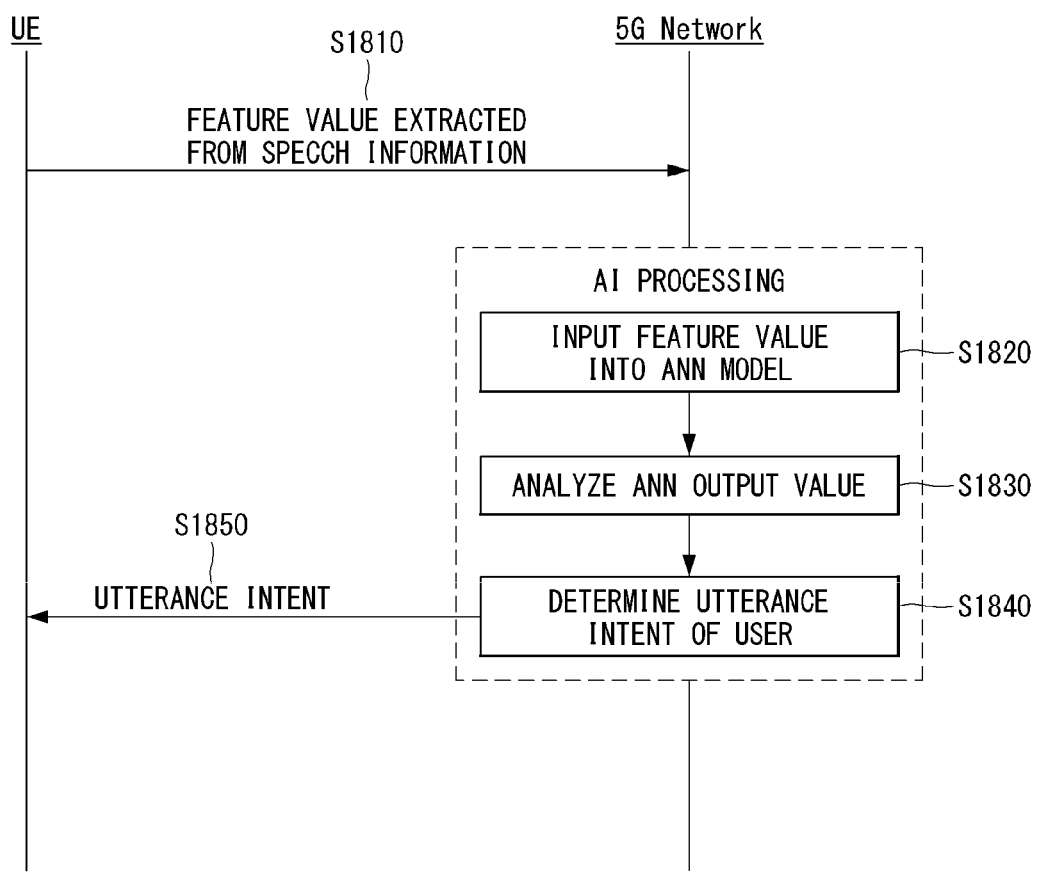
FIG. 18 is a flowchart of an example of performing a method for determining an utterance intent through AI processing of a 5G network.

FIG. 18 is a flowchart of an example in which a method for determining an utterance intent is performed through AI processing of a 5G network.

Referring to FIG. 18, the processor may control a communication module so that speech information of a user or a feature value extracted from the speech information are transmitted to an AI processor included in the 5G network. In addition, the processor may control the communication module so that AI-processed information is received from the AI processor.

Meanwhile, in order to transmit the speech information of the user to the 5G network, the processor may perform an initial access procedure with the 5G network. The processor may perform the initial access procedure with the 5G network based on a synchronization signal block (SSB).

In addition, the processor may receive downlink control information (DCI), which is used to transmit the speech information of the user through the communication module, from the network.

The controller may transmit the speech information of the user or the feature value extracted from the speech information to the 5G network based on the DCI.

The speech information or the feature value extracted from the speech information may transmitted to the 5G network through a physical uplink shared channel (PUSCH), and the SSB and a demodulation reference signal (DM-RS) of the PUSCH may be quasi-co-located (QCL) with respect to QCL type D.

Referring to FIG. 18, the processor may transmit speech information or a feature value extracted from the speech information to a 5G network through a communication module (S1810).

Here, the 5G network may include an AI processor or an AI system, and the AI system of the 5G network may perform AI processing based on received sensing information (S1820).

The AI system may input feature values received from an air purifier into an ANN model (S1830). The AI system may analyze an ANN output value, and calculate a weight from the ANN output value (S1840). The 5G network may generate cleaning efficiency and remaining lifespan information of the filter based on the weight calculated by the AI system, and may update the generated information (S1850).

An embodiment shown in FIG. 18 is described mainly about an exemplary operation performed by a server of the AI processor, but the corresponding operation may be performed by a processor of an external device.

Hereinafter, an intelligent device according to another embodiment of the present disclosure will be described with reference to FIG. 19. The intelligent device according to another embodiment of the present disclosure may be referred to as an AI device 20, and may include the same configurations as included in the aforementioned AI device 20.

However, in order to implement functions improved than those of the aforementioned AI device 20, the intelligent device according to another embodiment of the present disclosure may include more configurations than those included in the AI device 20, and, for helping convenience of apprehension, the AI device 20 and an intelligent device 1910 according to the present disclosure uses different reference numerals. However, basic configurations other than an element for performing an additional function are basically identical or similar between the AI device and the intelligent device 1910, and the name of the configurations may be exchangeable.

Figure 19:
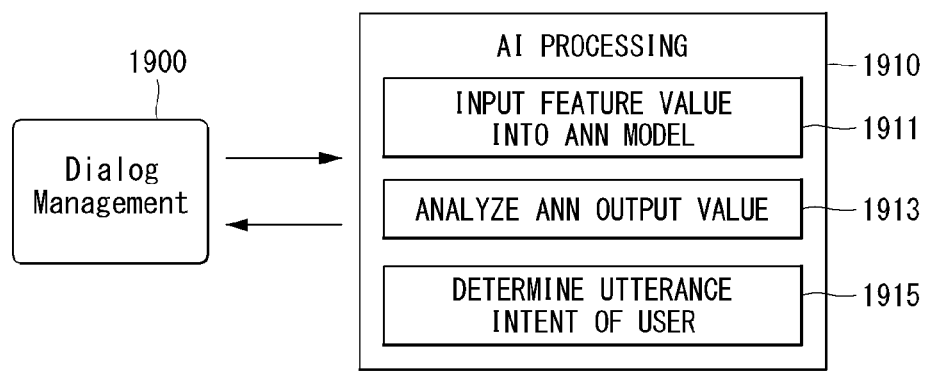
FIG. 19 is a block diagram illustrating configuration of an intelligent device according to another embodiment of the present disclosure.

Accordingly, in the intelligent device 1910 according to the present disclosure, the AI device 20 shown in FIG. 4 is not included in FIG. 19, but an AI processor 21, a memory 25, and a communication unit 27 may be included and may be integrated as a single module and referred to as an AI module.

FIG. 29 is a diagram showing configuration of an intelligent device 1910 according to another embodiment of the present disclosure.

An intelligent device 1900 according to the present disclosure includes an intent analyzer 1911, a database 1913, and a learning engine 1915. The intent analyzer 1911 may be configured as a server, and the learning unit 1915 may be configured as a module including a processor and a memory. In addition, the learning engine 1915 may be configured identically or similarly to the aforementioned data learning unit 22.

Meanwhile, as shown in FIG. 19, the intent analyzer 1911, the data base 1913, and the learning engine 1915 may be embedded in the intelligent device 1910, and, in a case where the intent analyzer 1911, the data base 1913, and the learning engine 1915 are connected to the intelligent device 1910 so as to enable data transmission and reception, the intent analyzer 1911, the data base 1913, and the learning engine 1915 may be disposed separately from the intelligent device 1910.

In addition, the learning engine 1915 may be configured inside the intent analyzer 1911 and nay be configured separately from the intent analyzer 1911.

The user terminal 1900 may interact with the intelligent device 1910. In the present disclosure, the intelligent device 1910 has a speech recognition function, and thus, the interaction is proceeded in a manner in which, when the user terminal 1900 asks a inquiry to the intelligent device 1910 to acquire information, the intelligent device 1910 provides a response to the inquiry.

Hereinafter, referring to FIGS. 20 to 27, a method in which the intelligent device 1910 according to the present disclosure improves a response error to a inquiry of a user will be described in detail.

Hereinafter, a user terminal 1900 may be defined as performing a function of receiving a speech input from a user and transmitting the speech input to the intelligent device 1910, and may be defined as a user.

Figure 20:
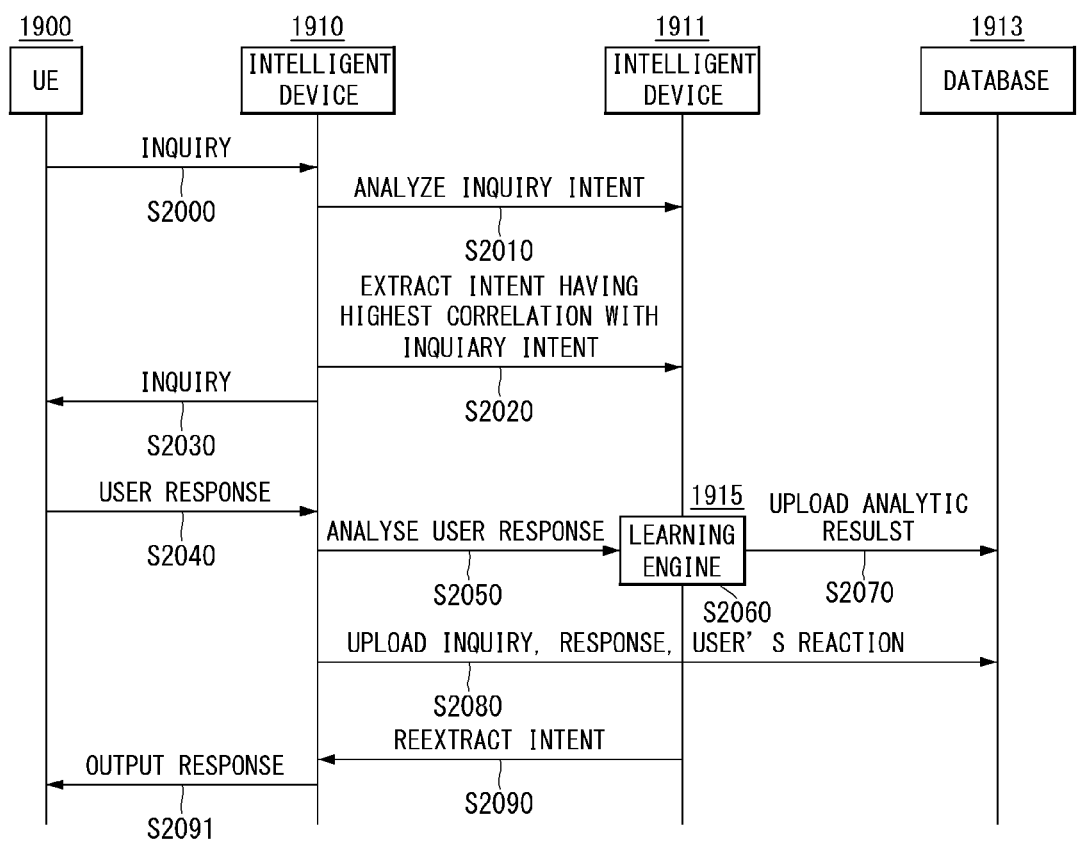
FIG. 20 shows an example in which an intelligent device according to another embodiment interacts with a user.

Referring to FIG. 20, the user terminal 1900 may ask a inquiry to the intelligent device 1910 to acquire necessary information (S2000). FIG. 20 is a diagram showing an example in which the intelligent device 1910 according to the present disclosure interact with a user.

For example, in a case where the user terminal or the user 1900 is a traveler at an airport, the user terminal or the user 1900 may ask a inquiry "Where is a place to get Tax Refund?" to the intelligent device 1910 in order to find a Tax Refund place.

The intelligent device 1910 may recognize the user's inquiry "Where is a place to get Tax Refund?" using a speech recognition technique, and analyze the intent of the user's inquiry in order to provide a response to the inquiry (S2010). In this case, the intent analyzer 1911 included in the intelligent device 1910 or connected to the intelligent device 1910 analyzes the intent of the user's inquiry "Where is a place to get Tax Refund?".

The intent analyzer 1911 may configure the intent of the inquiry of the user terminal or the user 1900 using keywords "Tax", "Refund"", "Where", and "place" included in the inquiry.

Figure 21:
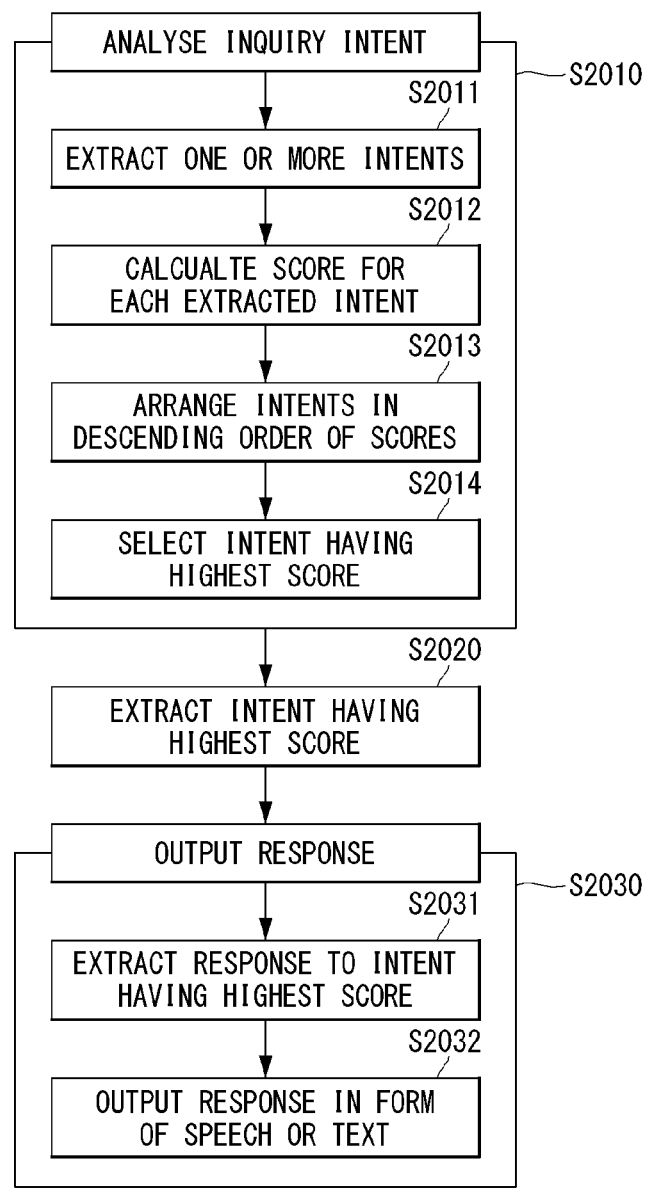
FIG. 21 is a flowchart of an example in which an intelligent device according to another embodiment analyzes an intent and outputs a response.

That is, as shown in FIG. 21, at least one intent of the user's inquiry may be extracted using the above keywords (S2011). FIG. 21 is a flowchart showing a process by which the intelligent device 1910 according to the present disclosure analyzes the intent and outputs a response.

The intent analyzer 1911 according to the present disclosure may calculate correlation between intents extracted from intents pre-stored in the intent analyzer 1911 and a keyword included in the user's inquiry, and calculate a score representing a degree of correlation of each extracted intent with the user's inquiry (s2012). Referring to FIG. 22, it is observed that how much each extracted intent is correlated with the user's inquiry is calculated into a score. FIG. 22 is a diagram showing a state in which a score calculated for extracted intent is calculated by the intelligent device 1910 according to the present disclosure.

In this case, the intent analyzer 1911 may make an error in calculating a wrong score in the assumption that intents extracted with reference to place-related keywords such as "Where" and "place" among keywords "Tax", "Refund", "Where", and "place" included in the user's inquiry has high correlation.

That is, the intent analyzer 1911 may fail to identify that the intent of the user's inquiry is "tax refund location" and may determine that the intent of the user's inquiry lies merely in "location"

Therefore, as shown in FIG. 22, a score for "shop location" is calculated into 0.6, "tax refund location" is calculated into 0.3, and another intent representing time ("airplane departure time") has a score relatively lower than other intent representing a location.

Next, the intent analyzer 1911 may arrange extracted intents in the descending order of scores (S2013), and may the extracted intents may be arranged as shown in FIG. 22. In this case, since the intent analyzer 1911 determines the true intent of the user's inquiry as an error, the intent regarding the "shop location" having the highest score of 0.6 is arranged at the top, and the intent regarding the "airplane departure time" having the lowest score is arranged at the bottom.

The intent analyzer 1911 may select the intent having the highest score in the arrangement result (S2014), and an intent regarding "shop location" is extracted from the intent analyzer 1911 as an intent that corresponds to the intent of the user's inquiry (S2020). That is, as shown in FIG. 22, "shop location (LOCATION_BUYING_GOODS)" is the intent having the highest score and is extracted from the intent analyzer (S2020).

Meanwhile, the intelligent device 1910 outputs a response corresponding to the selected intent to the user (S2030). To this end, the intelligent device 1910 may extract a response corresponding to the intent having the highest score among responses stored in the database 1913 (S2031). In addition, the intelligent device 1910 may output the extracted response in the form of a speech or a text through an output unit.

According to the above-described example, a process by which the intelligent device 1910 configures a response will be described as follows. The intelligent device 1910 may determine the intent of the user's inquiry as an intent to find "shop location (LOCATION_BUYING_GOODS)", and may make a wrong determination, based on the wrongly determined intent, that a product which the user wishes to purchase corresponds to a keyword "Tax" or "Refund" included in the user's inquiry.

Since the database 1913 does not have information on a shop selling the product "Tax" or "Refund" or a location of the shop, the intelligent device 1910 may generate a response that "There is no shop to buy 'Tax' or 'Refund'". Since the generated response is a response generated while the intent of the user's inquiry is wrongly determined, the generated response corresponds to a response error, but the intelligent device 1910 is not allowed in S2031 to be aware of whether the response error has occurred.

Accordingly, the intelligent device 1910 may output the extracted response "There is no shop to buy 'Tax' or 'Refund'" in the form of a text and/or a speech through a display installed in the intelligent device 1910 or through a speech output unit (S2032).

Meanwhile, in response to the user's inquiry "Where is a place to get Tax Refund?", the user terminal 1900 may recognize information indicating that there is no shop to buy 'Tax' or 'Refund', rather than information on a place to get Tax Refund. Then, the user terminal or the user 1900 may react to the wrong response from the intelligent device 1910 (S2050).

Such reaction of the user may include one or more of the user's gesture, facial expression, and an uttered speech, and the intelligent device 1910 may recognize the user's reaction through an embedded camera, an MIC, and/or various biometric information recognition sensors. The intelligent device 1910 may analyze the recognized reaction of the user (S2050), and the reaction of the user may be analyzed by a deep learning model in the learning engine 1915.

Figure 23:
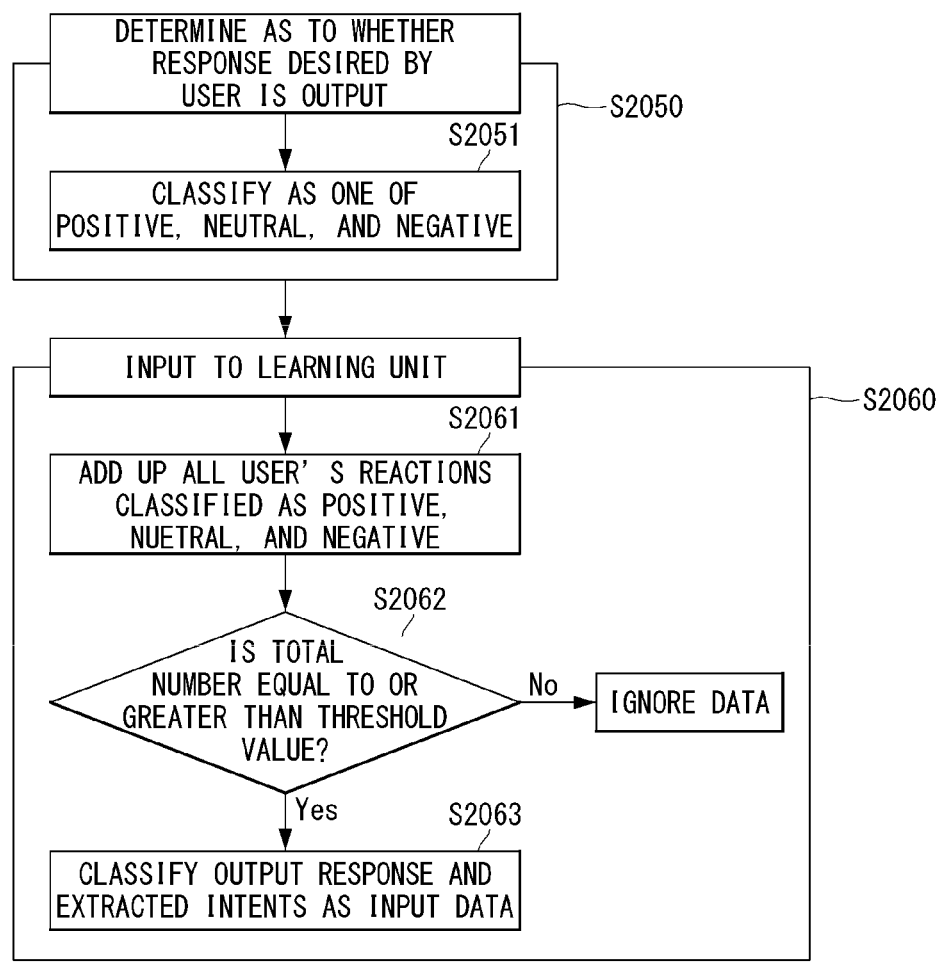
FIG. 23 is a flowchart showing a process by which an intelligent device according to another embodiment of the present invention learns the user's reaction.

Referring to FIG. 23, prior to classification as input data to be input into the deep learning model in the learning engine 1915, the reaction of the user may be classified as input data through a preprocessing process. FIG. 23 is a flowchart showing a process by which the intelligent device 1910 according to the present disclosure learns the user's reaction.

Referring to FIG. 23, once the user's reaction to a response suggested by the intelligent device 1910 is input to the intelligent device 1910 or recognized, the intelligent device 1910 may classify the user's reaction as positive, neutral, and negative (S2051) in order to analyze the user's reaction (S2050).

As shown in the above-described embodiment, in a case where the intelligent device 1910 suggests a response "There is no shop to buy 'Tax' or 'Refund'" with respect to the user's inquiry "Where is a place to get Tax Refund?", the user's reaction may be a negative reaction.

That is, since the user's reaction is comprised of the user's gesture, facial expression, and an uttered speech, if the user terminal 1900 fails to obtain a response regarding desired information from the intelligent device 1910, the user terminal 1900 may show various negative reactions such as shaking a head, frowning the face, making a sad facial expression, and/or a speech saying "No". In addition, by recognizing such negative reaction, the intelligent device 1910 may classify the user's reaction to the response suggested by the intelligent device 1910 as negative among positive, neutral, and negative (S2051).

Then, the intelligent device 1910 may set the user's inquiry (e.g., "Where is a place to get Tax Refund?"), the response suggested by the intelligent device 1910 (e.g., "There is no shop to buy 'Tax' or 'Refund'"), and the user's reaction to the suggested response (e.g., the above-described negative reaction) as input data, and input the input data into the learning engine 1915 (S2060).

Meanwhile, in order to precisely improve a response error, the intelligent device 1910 according to the present disclosure may be set to learn the user's reactions accumulated in the learning engine 1915 only when data on various reactions of various users are sufficiently collected and accumulated.

Accordingly, with respect to a specific user's inquiry (e.g., "Where is a place to get Tax Refund?", the intelligent device 1910 may identify whether the number of reactions of users collected for each response from the intelligent device 1910 (e.g., "There is no shop to buy 'Tax' or 'Refund'", or "The Tax Refund place is located on the first basement level") is equal to or greater than a threshold value (S2062).

That is, the intelligent device 1910 may add up the specific user's reactions classified as positive, neutral, and negative with respect to the specific user's inquiry (S2061), and may identify whether the number of the specific user's classified reactions is equal to or greater than the threshold value (S2062).

If the user's collected and classified reactions is smaller than the threshold value, data on the user's reaction classified as neutral and negative may be ignored (S2062:NO) and the ignored data may be recorded in the form of a log in the database 1913.

However, if the number of the user's collected and classified reactions is equal to or greater than the threshold value, corresponding responses inferring the user's reactions, an intent extracted from the intent analyzer 1911 to induce the responses, and the specific user's inquiry may be all classified as input data to be learned by the learning engine 1915. In addition, the threshold value may be preset by a manager.

That is, as shown in FIG. 24, the intelligent device 1910 may digitize positive, neutral, and negative reactions of the specific user with respect to responses to the specific user's inquiry. FIG. 24 is a diagram showing an example in which the intelligent device 1910 according to the present disclosure classifies and digitizes a user's reaction.

For example, in a case where a user's inquiry is "Where is Silla Duty Free Shop?", the intelligent device 1910 may suggest "duty free shop location (LOCATION_DUTY_FREE_SHOP)" as an accurate response according to a result of analysis of an intent of the user's inquiry may wrongly analyze the intent of the user and suggest "airplane departure time ((AIRPLANE_DEPARTURE_TIME)" or "shop location (LOCATION_BUYING_GOODS)".

If the intelligent device 1910 suggests "duty free shop" as a response, the intelligent device 1910 may classify the user's reactions to the response into two-hundred positive responses, one-hundred neutral responses, and three negative responses. In addition, if the intelligent device 1910 suggests "airplane departure time" as a response, the intelligent device 1910 may classify the user's reactions to the response into none positive reaction, ten neutral reactions, and two-hundred negative responses. In addition, if the intelligent device 1910 suggests "shop location" as a response, the intelligent device 1910 may classify the user's reactions to the response into twenty positive reactions, twenty neutral reactions, and fifty negative reactions.

The intelligent device 1910 may be set to classify data on the user's reactions to a specific response as input data for the learning engine 1915 only when a total number of positive and negative responses among the user's reactions to the specific response is two hundred or more. Accordingly, in a case where the user's inquiry is "Where is Silla Duty Free Shop?" and a response "shop location" is suggested, the user's reaction may not be classified as input data for the learning engine 1915.

Meanwhile, in a case where the user's inquiry is "Where is Silla Duty Free Shop?" and a response "airplane departure time" is suggested, a total number of the user's reactions is two hundred or more and thus the user's reactions may be classified as input data for the learning engine 1915.

Figure 25:
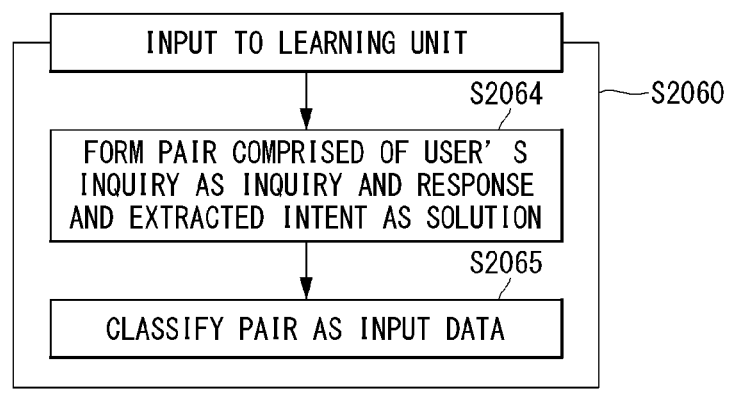
FIG. 25 is a flowchart for explaining an example in which an intelligent device according to another embodiment of the present invention configures input data.

In addition, the intelligent device 1910 may configure input data as shown in FIG. 25. FIG. 25 is a flowchart showing an example in which the intelligent device 1910 according to the present disclosure configures input data.

As a learning model for the learning engine 1915, the intelligent device 1910 may utilize supervised learning that aims to address a question, which is the user's inquiry (e.g., Where is Silla Duty Free Shop?"), and a solution, which are a response suggested to the inquiry (e.g., "airplane departure time"), the user's reaction to the suggested response (e.g., ten neutral reactions and two-hundred negative reactions), and an intent used to extract the response (e.g., "duty free shop location", "airplane departure time", and "shop location"). In this case, the user's inquiry is input data, and the response, the user's reaction, and the intent are output data. In addition, the input data and the output data are formed as a single pair (S2064), and may be classified as input data for a learning model having multiple layers (S2065). In this case, an accurate learning result may be derived through passing through the multiple layers.

Meanwhile, in order to apply a learning result of the learning engine 1915 to identify the intent of the inquiry, the intelligent device 1910 may apply the learning result in a process of analyzing the user's intent.

Figure 26:
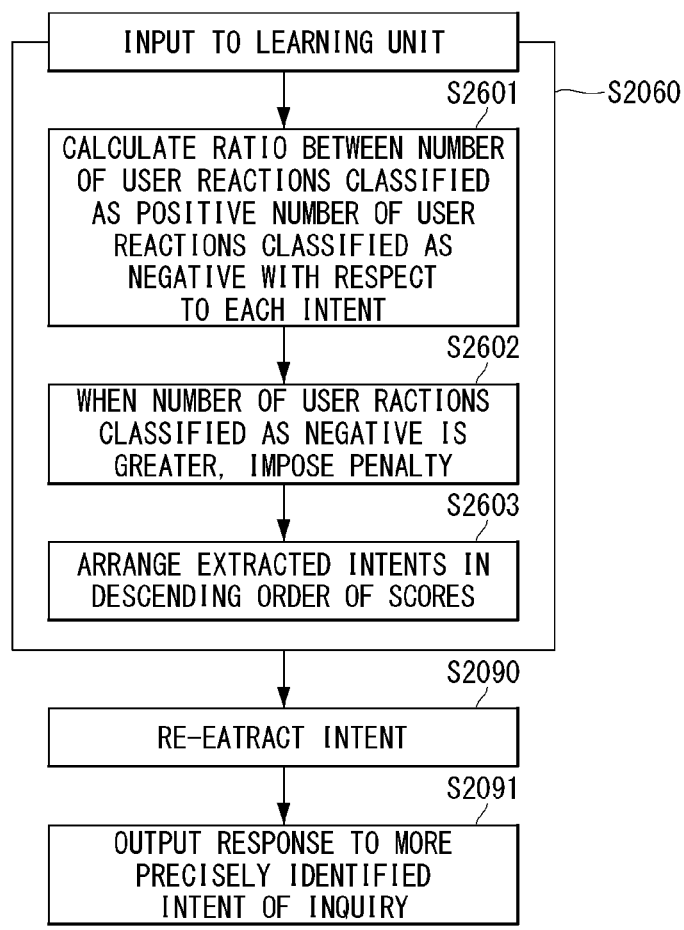
FIG. 26 is a flowchart for explaining a process by which an intelligent device according to another embodiment of the present invention applies a result of learning a user's reaction in identifying the user's inquiry.

As shown in FIG. 26, when analyzing the user's intent according to a result of learning of the user's reaction by the learning engine 1915, the intelligent device 1910 may impose an extra point or a penalty for each intent. FIG. 26 is a flowchart showing a process by which the intelligent device 1910 according to the present disclosure applies a result of learning a user's reaction in identifying the intent of the user's inquiry.

First, in a case where the user's inquiry is "Where is Silla Duty Free Shop?" (S2000 in FIG. 20), intents extracted to extract the intent of the user's inquiry (S2010) may be as follows, as in FIG. 24:

"LOCATION_DUTY_FREE_SHOP?;
"AIRPLANE_DEPARTURE_TIME?; and
"LOCATION_BUYING_GOODS" (S2020 in FIG. 20).

In this case, based on a learning result of the learning engine 1915, the intelligent device 1910 may calculate a ratio of positive reactions to negative reactions with respect to each of "LOCATION_DUTY_FREE_SHOP?", "AIRPLANE_DEPARTURE_TIME?", and "LOCATION_BUYING_GOODS" (S2061 in FIG. 26).

Next, when analyzing the intent of the user's inquiry, the intelligent device 1910 may impose a penalty to an intent having a high proportion of negative reactions, for example, "AIRPLANE_DEPARTURE_TIME" and "LOCATION_BUYING_GOODS".

That is, as described above, the intent analyzer 1911 according to the present disclosure may calculate correlation between each extracted intent among intents pre-stored in the intent analyzer 1911 and a keyword included in the user's inquiry, and calculate a score representing the correlation between each extracted intent and the user's inquiry (S2012). In this course, the intent analyzer 1911 may impose a penalty by applying a learning result of the learning engine 1915 (S2602).

For example, a score of 0.6 may be calculated for the intent "LOCATION_DUTY_FREE_SHOP" derived in S2012, a score of 0.8 may be calculated for the intent "AIRPLANE_DEPARTURE_TIME" derived in S2012, and a score of 0.4 may be calculated for the intent "LOCATION_BUYING_GOODS" derived in S2012.

Meanwhile, with respect to the intent of "AIRPLANE_DEPARTURE_TIME" which has a high proportion of negative reactions, the negative reactions is 200% more than positive reactions, and thus, the intelligent device 1910 may impose a penalty to subtract 1.6, which is two times greater than 0.8, from 0.8 (S2602).

In addition, with respect to the intent of "LOCATION_BUYING_GOODS" which has a high proportion of negative reactions, the negative reactions is 50% more than positive reactions, and thus, the intelligent device 1910 may impose a penalty to subtract 0.4, which corresponds to 0.5 of 0.4, from 0.2 (S2612).

Next, the intelligent device 1910 may re-arrange intents in the descending order of scores (S2613), and accordingly, "LOCATION_DUTY_FREE_SHOP" having 0.6 becomes the intent having the highest score.

The intelligent device 1910 may extract the intent "LOCATION_DUTY_FREE_SHOP" having the highest score from the intent analyzer 1911 (S2090). In addition, the intelligent device 1910 may output a response corresponding to the extracted intent (S2091), thereby precisely identify the intent of the user's inquiry and outputting a response corresponding to the intent.

In addition, the intelligent device 1910 according to the present disclosure may upload data on a learning result of the learning engine 1915 or data on the user's reaction in the database (S2070 and S2080) so that the learning result of the learning engine 1915 can be constantly reflected in the intent analyzer 1911.

Figure 27:
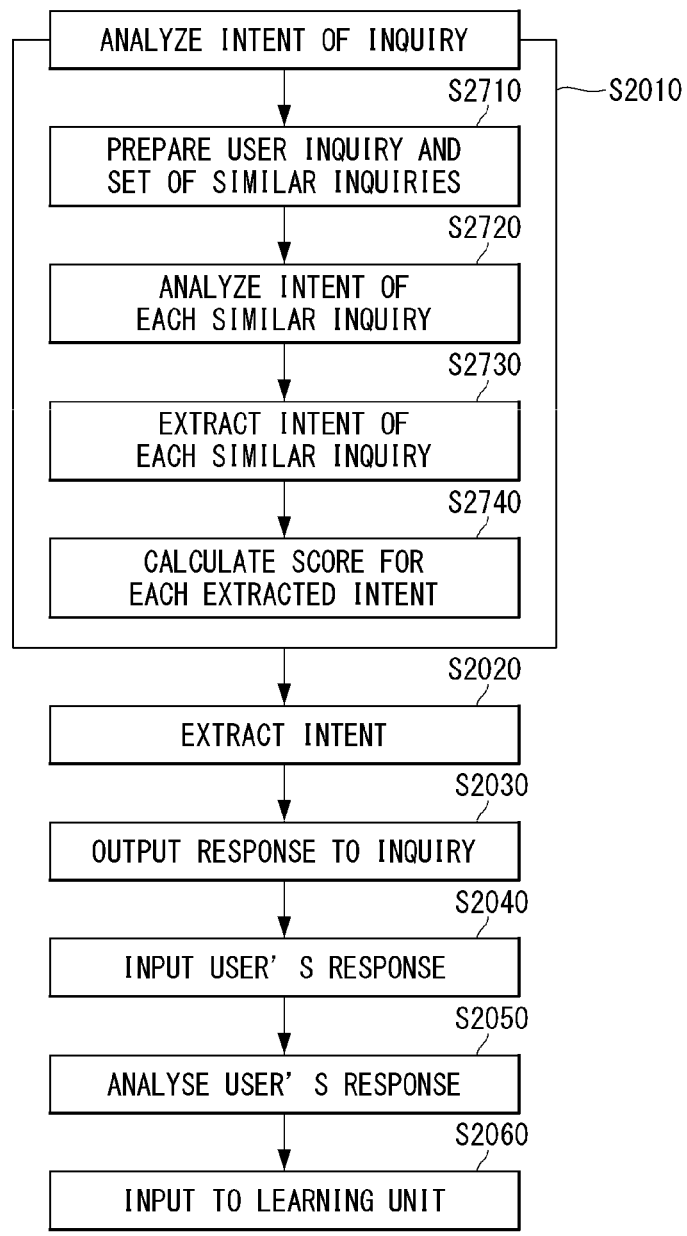
FIG. 27 is a flowchart for explaining a process by which an intelligent device according to another embodiment of the present invention learns a similar inquiry.

Meanwhile, in order to precisely identify the user's intent even with respect to a inquiry similar to a specific inquiry, the intelligent device 1910 according to the present disclosure may learn the similar inquiry and the user's reaction, as shown in FIG. 27. FIG. 27 is a flowchart showing a process by which the intelligent device 1910 according to the present disclosure learns a similar inquiry.

Referring to FIG. 27, in a case where the user terminal 1900 ask a similar inquiry "Where is a location to buy a duty free product?" rather than a specific inquiry "Where is Silla Duty Free Shop?" (S2000 in FIG. 20), the intelligent device 1910 prepares similar inquiries having semantics or contents similar to the specific inquiry from the database 1913 (S2710). Then, the intelligent device 1910 may analyze a similarity between the specific inquiry and each of the similar inquiries, and select only similar inquiries having high similarity.

Next, the intelligent device 1910 may analyze the intent of each selected similar inquiry (S2720), and the step S2720 is performed by the intent analyzer 1911. The intent analyzer 1911 extracts at least one pre-stored intent from the database 1913 (S2730), and calculates a score representing how much each extracted intent is correlated with a keyword indicating the intent or content of a corresponding similar inquiry (52740).

In the step S1204, the specific user's inquiry pre-learned by the learning engine 1915, a response, and the user's reaction may be reflected. That is, the aforementioned steps S2061 and S2061 of imposing a penalty may be applied even in the step S1204.

Next, the intelligent device 1910 extracts an intent having the highest score from the intent analyzer (S2020), and output a response corresponding to the intent extracted in the step S2020 (S2030).

Next, if the user's reaction to the output response is input into the intelligent device 1910 (S150), the intelligent device 1910 analyzes the user's reaction (S2050), and the process of analyzing the user's reaction may be performed identically as in the aforementioned steps S2051, S2061, S2062, S2063.

In addition, in order to more precisely identify the intent of a similar inquiry, the intelligent device 1910 according to the present disclosure may use supervised learning as a learning model of the learning engine 1915, the supervised learning which aims to address a question, which is the user's inquiry (e.g., Where is Silla Duty Free Shop?"), and a solution, which are a response suggested to the inquiry (e.g., "airplane departure time"), the user's reaction to the suggested response (e.g., ten neutral reactions and two-hundred negative reactions), and an intent used to extract the response (e.g., "duty free shop location", "airplane departure time", and "shop location").

To this end, the intelligent device 1910 may classify the similar inquiry, the user's reactions, and intents as input data in the form of a single pair.

The above-described present disclosure can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (for example, transmission over the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A speech recognition method of an artificial intelligence robot, the method comprising:
   receiving uttered speech information of a user from an external device;
   inputting the speech information to a pre-learned first intent analysis model, and determining an utterance intent of the user according to an output value of the first intent analysis model;
   transmitting response information corresponding to the determined utterance intent of the user to the external device;
   receiving evaluation information of the user on the response information from the external device; and
   generating a second intent analysis model by adding the evaluation information to learning data and learning the first intent analysis model,
   wherein the evaluation information comprises any one of positive responses, negative responses, and neutral responses with respect to the response information, and
   wherein the generating of the second intent analysis model further comprises:
   retrieving the positive responses, the negative responses, and the neutral responses;
   calculating a number of the positive responses, a number of the negative responses, and a number of the neutral responses; and
   determining as to whether the number of the positive responses, the number of the negative responses, and the number of the neutral responses are respectively equal to or greater than a preset threshold value.

2. The method of claim 1, wherein the evaluation information is determined by analyzing a behavior pattern or a speech pattern of the user.

3. The method of claim 1, wherein the generating of the second intent analysis model comprises;
   comparing the number of the positive responses and the number of the negative responses; and
   assigning a reward based on a result of the comparison.

4. The method of claim 3, wherein, in the assigning of the reward, when the number of the positive responses is greater than the number of the negative responses, a positive reward is assigned in proportion to a difference between the number of the positive responses and the number of the negative responses.

5. The method of claim 3, wherein, in the assigning of the reward, when the number of the positive responses is less than the number of the negative responses, a negative reward is assigned in proportion to a difference between the number of the positive responses and the number of the negative responses.

6. The method of claim 1, wherein the determining comprises:
   determining reliability of a plurality of candidate utterance intents based on at least one word included in the received speech information;
   detecting the candidate utterance intent having reliability equal to or greater than a preset reference value among the plurality of candidate utterance intents; and
   determining the detected candidate utterance intent as an utterance intent of the user.

7. The method of claim 6, further comprising transmitting a control signal to the external device based on the utterance intent having the highest reliability among the plurality of candidate utterance intents.

8. The method of claim 1, wherein the response information comprises an entity name and the utterance intent.

9. The method of claim 1, further comprising:
   performing language processing of the speech information to calculate a sentence similarity;
   calculating a similarity of a candidate corpus stored in a corpus memory with a sentence on which the language processing is performed; and
   grouping sentences having the calculated similarity equal to or greater than a preset threshold value.

10. The method of claim 9, further comprising retrieving the utterance intent predetermined for each sentence included in the grouped sentences and the evaluation information on the utterance intent.

11. The method of claim 10, wherein, in the generating of the second intent analysis model, the first intent analysis model is learned by adding the evaluation information on the utterance intent predetermined for each sentence included in the grouped sentences.

12. The method of claim 1, further comprising;
transmitting the speech information of the user or a feature value extracted from the speech information to an artificial intelligence (AI) processor included in a 5G network through a communication module; and
receiving AI-processed information from the AI processor.

13. The method of claim 12, further comprising:
performing an initial access procedure with a user equipment (UE) by periodically transmitting a synchronization signal block (SSB);
performing a random access procedure with the UE; and
transmitting an uplink (UL) grant to the UE, for scheduling transmission of the speech information of the user or the feature value extracted from the speech information.

14. The method of claim 13, wherein the performing of the random access procedure comprises:
receiving a physical random access channel (PRACH) preamble from the UE; and
transmitting a response to the PRACH preamble to the UE.

15. The method of claim 14, wherein the performing of the random access procedure further comprises:
receiving a PRACH preamble from the UE; and
transmitting a response to the PRACH preamble to the UE.

16. The method of claim 15, further comprising performing a downlink (DL) beam management (BM) procedure using the SSB.

17. The method of claim 16, wherein the performing of the DL BM procedure comprises:
transmitting a list of SSB resources used for the BM and report in one resource set to the UE;
transmitting a signal on SSB resources to the UE; and
receiving a best SSB resource indicator (SSBRI) and reference signal received power (RSRP) corresponding thereto from the UE.

18. The method of claim 14, further comprising:
transmitting configuration information of a reference signal related to beam failure detection to the UE; and
receiving a PRACH preamble for requesting beam failure recovery from the UE.

* * * * *